United States Patent
Takata et al.

(10) Patent No.: US 10,416,970 B2
(45) Date of Patent: Sep. 17, 2019

(54) ANALYSIS DEVICE, ANALYSIS METHOD, AND ANALYSIS PROGRAM

(71) Applicant: NIPPON TELEGRAPH AND TELEPHONE CORPORATION, Chiyoda-ku (JP)

(72) Inventors: Yuta Takata, Musashino (JP); Mitsuaki Akiyama, Musashino (JP); Takeshi Yagi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 32 days.

(21) Appl. No.: 15/512,680

(22) PCT Filed: Oct. 13, 2015

(86) PCT No.: PCT/JP2015/078906
§ 371 (c)(1),
(2) Date: Mar. 20, 2017

(87) PCT Pub. No.: WO2016/060110
PCT Pub. Date: Apr. 21, 2016

(65) Prior Publication Data
US 2017/0293477 A1    Oct. 12, 2017

(30) Foreign Application Priority Data

Oct. 14, 2014  (JP) .................................. 2014-210126
Apr. 20, 2015  (JP) .................................. 2015-085821

(51) Int. Cl.
*G06F 8/41*     (2018.01)
*G06F 16/951*   (2019.01)
(Continued)

(52) U.S. Cl.
CPC ................ *G06F 8/42* (2013.01); *G06F 13/00* (2013.01); *G06F 16/951* (2019.01); *G06F 16/9566* (2019.01); *G06F 21/56* (2013.01)

(58) Field of Classification Search
CPC . G06F 17/30864; G06F 17/30887; G06F 8/42
See application file for complete search history.

(56) References Cited

U.S. PATENT DOCUMENTS 6,092,194 A    7/2000  Touboul
6,167,520 A   12/2000  Touboul
(Continued)

FOREIGN PATENT DOCUMENTS

CN    103970845 A    8/2014
JP    2002-514326 A   5/2002
WO    98/21683 A2     5/1998

OTHER PUBLICATIONS

Extended European Search Report dated Feb. 20, 2018 in Patent Application No. 15850892.9, citing documents AW-AY therein, 11 pages.

(Continued)

*Primary Examiner* — Wei Y Zhen
*Assistant Examiner* — Amir Soltanzadeh
(74) *Attorney, Agent, or Firm* — Oblon, McClelland, Maier & Neustadt, L.L.P.

(57) ABSTRACT

A program analysis unit of a browser emulator manager exhaustively searches a code by performing syntax analysis of a code included in web content to search a transfer code to another site or a content acquisition code, and specifies at least any of an object and a function and a property of the object used in the code found as a result of the search. Further, the program analysis unit extracts a code having a dependence relationship with the transfer code or the content (Continued)

acquisition code based on at least any of the object and the function and the property of the object thus specified.

10 Claims, 28 Drawing Sheets

(51) Int. Cl.
*G06F 16/955* (2019.01)
*G06F 13/00* (2006.01)
*G06F 21/56* (2013.01)

(56) References Cited

U.S. PATENT DOCUMENTS

| | | | |
|---|---|---|---|
| 6,480,962 B1 | 11/2002 | Touboul | |
| 6,804,780 B1 | 10/2004 | Touboul | |
| 8,726,392 B1 | 5/2014 | McCorkendale et al. | |
| 2008/0196012 A1* | 8/2008 | Cohen | G06F 8/75 717/125 |
| 2009/0249307 A1* | 10/2009 | Yoshida | G06F 8/75 717/131 |
| 2011/0197177 A1 | 8/2011 | Mony | |
| 2011/0314546 A1* | 12/2011 | Aziz | G06F 21/56 726/24 |

OTHER PUBLICATIONS

Qi Wang, et al., "Extracting URLs from JavaScript Via Program Analysis" Retrieved from the Internet: URL:http://stap.sjtu.edu.cn/index.php?title=File%3AExtractingAnalysis.pdf&oldid=233, XP055448634, May 3, 2013, 15 Pages.

David W. Binkley, et al., "Program Slicing" Advances in Computer, XP055449264, Jan. 1, 1996, pp. 1-52.

Yuta Takata, et al., "MineSpider: Extracting URLs from Environment-Dependent Drive-by Download Attacks" 2015 IEEE 39th Annual International Computers, Software and Applications Conference, vol. 2, XP033207349, Jul. 1, 2015, pp. 444-449.

International Search Report dated Jan. 19, 2016, in PCT/JP2015/078906, filed Oct. 13, 2015.

Nazario, "PhoneyC: A Virtual Client Honeypot", Proceeding of the USENIX Workshop on Large-Scale Exploits and Emergent Threats (LEET), Apr. 1, 2009, 8 pages, https://www.usenix.org/legacy/events/leet09/tech/full_papers/nazario/nazario.pdf.

Cova, et al. "Detection and Analysis of Drive-by-Download Attacks and Malicious JavaScript Code", Proceedings of the World Wide Web Conference (WWW), Apr. 2010, 10 pages, http://www.cs.ucsb.edu/~vigna/publications/2010_cova_kruegel_vigna_Wepawet.pdf.

Takata, et al. "An Investigation of Malicious JavaScript Code used in Drive-by Download", Technical Report of IEICE, Mar. 2014, 6 pages, with partial English translation, http://www.ieice.org/ken/paper/20140327QBIZ/.

Wang, et al. "Extracting URLs from JavaScript via Program Analysis", Proceedings of the 9th joint meeting of the European Software Engineering Conference and the ACM SIGSOFT Symposium on the Foundations of Software Engineering, Aug. 2013, 15 pages, http://stap.sjtu.edu.cn/images/2/2e/ExtractingAnalysis.pdf.

Weiser, "Program Slicing", Proceedings of the 5th International Conference on Software Engineering, 1981, pp. 439-449, http://dl/acm.org/citation.cfm?id=802557.

Takata, et al. "Improving Coverage of Environment-dependent Code Using Program Slicing to Extract Potential URLs", NTT Secure Platform Laboratories, 8 pages, with partial English translation.

Office Action dated Apr. 1, 2019 in Chinese Application No. 201580055514.X (w/computer-generated English translation).

Qi Wang, et al. "Extracting URLs from JavaScript via Program Analysis", ESEC/FSE 2013 Proceedings of the 2013 9th Joint Meeting on Foundations of Software Engineering, pp. 627-630.

David W. Binkley et al., "Program Slicing", 52 pages.

* cited by examiner

FIG.3

```
1    var jre_version = pd.getVersion ('Java');
2    var path = "next_url";
3    var src = "http://example.com/exploit/?jre=";
4    var jre = jre_version.split (",");
5    if (jre [1] == "6") {
6        var ifr=document.createElement("iframe");
7        ifr.setAttribute ("src", src + jre[1]);
8        document.body.appendChild (ifr);
9    }
10   else {
11       location.href = "http://example.net/" + path  ;
12   }
```

FIG.4

```
window.location = "URL";
location.href = "URL";
location.assign("URL");
location.replace("URL");
```

EXAMPLE OF TRANSFER CODE

```
element.innerHTML = "HTML TAG";
document.write("HTML TAG");
document.writeln("HTML TAG");
element.setAttribute("src", "URL");
```

EXAMPLE OF CONTENT ACQUISITION CODE

```
<iframe src>
<frame src>
<script src>
<embed src>
<applet archive>
<object data>
<meta conent>
```

EXAMPLE OF PAIR OF HTML TAG USED IN CONTENT ACQUISITION CODE AND ATTRIBUTE NAME THEREOF

```
1   var jre_version = pd.getVersion ('Java');
2   var path = "next_url";
3   var src = "http://example.com/exploit/?jre=";
4   var jre = jre_version.split (",");
5   if (jre [1] == "6") {
6       var ifr=document.createElement("iframe");
7       ifr.setAttribute ("src", src + jre[1]);
8       document.body.appendChild (ifr);
9   }
10  else {
11      location.href = "http://example.net/" + path ;
12  }
```

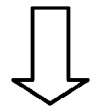

702

```
1   var jre_version = pd.getVersion ('Java');
2   
3   var src = "http://example.com/exploit/?jre=";
4   var jre = jre_version.split (",");
5   
6       var ifr=document.createElement("iframe");
7       ifr.setAttribute ("src", src + jre[1]);
8   
9   
10  
11  
12  
```

FIG.8

| ANALYSIS ID | TIME STAMP | ACCESS URL | SLICE |
|---|---|---|---|
| 1 | 2014/09/01 16:00:00.0000 | http://example.com/ | 0 |
| 2 | 2014/09/01 16:00:02.0000 | http://example.com/test.html | 0 |
| 3 | 2014/09/01 16:00:04.0000 | http://example.com/exploit/?jre=6 | 1 |
| 4 | 2014/09/01 16:00:05.0000 | http://example.net/next_url | 1 |
| ⋮ | ⋮ | ⋮ | ⋮ |
| 51 | 2014/09/01 16:10:00.0000 | http://example.com/ | 0 |
| 52 | 2014/09/01 16:10:02.0000 | http://example.com/example.html | 0 |
| 53 | 2014/09/01 16:10:04.0000 | http://example.org/sample.js | 1 |
| ⋮ | ⋮ | ⋮ | ⋮ |

FIG.14

```
1  var jre_version = pd.getVersion('Java');
2  var jre = jre_version.split(",");
3  var d = "A.example";
4  var url = "";
5  if (jre[1] == "6") {
6    url = "http://"+d+"/mal1/";
7  }
8  else if (jre[1] == "7") {
9    url = "http://"+d+"/mal2/";
10 }
11 else {
12   url = "http://B.example/benign/";
13 }
14 location.href = url;
```

```
window.location = "URL";
location.href = "URL";
location.assign("URL");
location.replace("URL");
XMLHttpRequest.send("URL");
```

EXAMPLE OF SCRIPT TRANSFER CODE

402a

```
element.innerHTML = "HTML TAG";
document.write("HTML TAG");
document.writeln("HTML TAG");
element.setAttribute("src", "URL");
```

EXAMPLE OF TAG TRANSFER CODE

403a

```
<iframe src>
<frame src>
<script src>
<embed src>
<applet archive>
<object data>
<meta content>
```

EXAMPLE OF PAIR OF HTML TAG USED IN CODE AND ATTRIBUTE NAME THEREOF

FIG.19

801a
```
1  var d = "A.example";
2  var url = "";
3
4  if (jre[1] == "6") {
5      url = "http://"+d+"/mal1/";
6  }
7  else if (jre[1] == "7") {
8      url = "http://"+d+"/mal2/";
9  }
10 else {
11     url = "http://B.example/benign/";
12 }
13 location.href = url;
14
```

802a
```
1  var d = "A.example";
2  var url = "";
3
4
5  url = "http://"+d+"/mal1/";
6
7
8
9
10
11
12
13 location.href = url;
14
```

803a
```
1  var d = "A.example";
2  var url = "";
3
4
5
6
7
8  url = "http://"+d+"/mal2/";
9
10
11
12
13 location.href = url;
14
```

804a
```
1  var d = "A.example";
2  var url = "";
3
4
5
6
7
8
9
10
11 url = "http://B.example/benign/";
12
13 location.href = url;
14
```

FIG.22

| ANALYSIS ID | TIME STAMP | ACCESS URL | SLICE | ENVIRONMENT INFORMATION |
|---|---|---|---|---|
| 1 | 2015/01/01 16:00:00.0000 | http://A.example/ | 0 | |
| 2 | 2015/01/01 16:00:02.0000 | http://A.example/mal1/ | 1 | java |
| 3 | 2015/01/01 16:00:04.0000 | http://A.example/mal2/ | 1 | java |
| 4 | 2015/01/01 16:00:05.0000 | http://B.example/benign/ | 1 | java |
| ⋮ | ⋮ | ⋮ | ⋮ | |
| 51 | 2015/01/01 16:10:00.0000 | http://C.example/ | 0 | |
| 52 | 2015/01/01 16:10:02.0000 | http://C.example/test.html | 0 | |
| 53 | 2015/01/01 1610:04.0000 | http://D.example/sample.js | 1 | PDF |
| ⋮ | ⋮ | ⋮ | ⋮ | |

ANALYSIS DEVICE, ANALYSIS METHOD, AND ANALYSIS PROGRAM

FIELD

The present invention relates to an analysis device, an analysis method, and an analysis program.

BACKGROUND

Conventionally, methods of detecting a malicious code by executing the malicious code using an emulator of a browser (hereinafter, referred to as a browser emulator) and analyzing an execution result thereof against a cyber attack such as a drive-by download attack have been known (for example, see Non Patent Literature 1, Non Patent Literature 2).

This drive-by download attack causes a client to pass a plurality of websites (hereinafter, referred to as a stepping-stone URL (Uniform Resource Locator) and then, be transferred to a malicious website (hereinafter, referred to as an attack URL) that executes an attack code using a code such as JavaScript (registered trademark). When the client accesses the attack URL, the attack code that exploits vulnerabilities of a browser or a plug-in of the browser (hereinafter, referred to as the plug-in) is executed, and the client is forced to download and install a malicious program such as a computer virus.

The browser emulator detects the malicious code by monitoring execution of codes included in a website in the unit of functions and detecting unauthorized use of functions of the browser or the plug-in having vulnerabilities. The malicious code exploits the vulnerabilities of the functions prepared in the browser or the plug-in and causes buffer overflow that rewrites a memory area of a computer in an unauthorized manner or a heap spray that operates a memory allocation method in an unauthorized manner by inputting a long character string or a large numeric value, thereby executing the attack code. Thus, the browser emulator detects the malicious code by monitoring use of the vulnerable plug-in or input of a character string and input of a numeric value into a function according to the code.

For example, the browser emulator prepares an attack code with respect to a function of a vulnerable component of ActiveX (registered trademark) focusing on ActiveX (registered trademark), which is a plug-in of Internet Explorer (registered trademark) in advance as a signature, and determines a website as a malicious website when an executed code thereof matches the signature (see Non Patent Literature 1).

In addition, the browser emulator collects a function (for example, substring( )) to operate a character string of JavaScript (registered trademark), the number of times of execution of a function (for example, eval( )) to dynamically generate a code, and argument information used in the functions, and a detection technique using machine learning based on the collected information has been also devised (see Non Patent Literature 2).

Meanwhile, the malicious code exploits vulnerabilities of wide range of applications (examples of the browser include Internet Explorer (registered trademark), Firefox (registered trademark), Opera (registered trademark) and the like and examples of the plug-in include Adobe Acrobat (registered trademark), Adobe Flash Player (registered trademark), Oracle JRE (registered trademark) and the like). Types of vulnerabilities to be exploited are subdivided for each type of an OS (Operating System), the browser and the plug-in, and each version (hereinafter, referred to as client environment) thereof and are diverse.

In addition, it is possible to acquire client environment information in JavaScript (registered trademark) using browser fingerprinting that identifies client environment that has accessed a website.

In the stepping-stone URL in the drive-by download attack, the client environment information is acquired using this browser fingerprinting, and a code (hereinafter, referred to as a transfer code) that causes only a client having client environment as an attack target to be transferred to the attack URL, an HTML (HyperText Markup Language) tag input code (hereinafter, referred to as a content acquisition code) that acquires content including the attack code are executed by a control statement based on the client environment information (hereinafter, referred to as an environment-dependent attack) (see Non Patent Literature 3). Therefore, the technique of detecting the malicious code does not effectively function in the above-described related art since it is difficult to reach the attack URL when the client environment set in the browser emulator is different from the client environment as the attack target.

Meanwhile, a technique of exhaustively analyzing a code using a technique such as an abstract syntax tree and program slicing and extracting a URL embedded in JavaScript (registered trademark) (see Non Patent Literature 4). The abstract syntax tree (AST) is a data structure that represents a program structure using an abstract tree structure. It is possible to exhaustively analyze the program by exploring the abstract syntax tree. That is, it is possible to analyze a code without depending on the program structure, and thus, it is possible to statically analyze even a code that is not likely to be executed by the control statement of JavaScript (registered trademark).

In addition, the program slicing is a technique of extracting some sets of statements relating to a variable v that is focused in an arbitrary statement s in a program, called a slicing criteria <s,v> (see Non Patent Literature 5). The set of statements extracted according to the slicing criteria is called a slice. As techniques of extracting such a slice, a program slicing technique based on a data flow or a program slicing technique based on a dependency graph have been known.

In Non Patent Literature 4, a code that results in use of a URL is specified using the abstract syntax tree of the entire JavaScript (registered trademark) acquired at the time of accessing a website. Thereafter, the execution of a code is performed by a JavaScript (registered trademark) interpreter after removing a URL-irrelevant code using the program slicing. However, the technique is implemented by its own JavaScript (registered trademark) interpreter, and does not cope with a code that refers to plug-in information of a client. In addition, the technique aims to improve coverage of a search engine, and thus, also extracts a URL used for a tag, a form tag or the like which is less likely to be used as the attack URL.

CITATION LIST

Non Patent Literature

Non Patent Literature 1: Jose Nazario, "PhoneyC: A Virtual Client Honeypot", In Proceedings of the USENIX Workshop on Large-Scale Exploits and Emergent Threats (LEET), April 2009, [searched in Sep. 2, 2014], Internet <URL:https://www.usenix.org/legacy/events/leet09/tech/full_ papers/nazario/nazario.pdf>

Non Patent Literature 2: Marco Cova, Christopher Kruegel, Giovanni Vigna, "Detection and Analysis of Drive-by-Download Attacks and Malicious JavaScript Code", In Proceedings of the World Wide Web Conference (WWW), April 2010, [searched in Sep. 2, 2014], Internet <URL:http://www.cs.ucsb.edu/~vigna/publications/2010_cova_k ruegel_vigna_Wepawet.pdf>

Non Patent Literature 3: Yuta Takata, Mitsuaki Akiyama, Takeo Hariu, "An Investigation of Malicious JavaScript Code used in Drive-by Download", The Institute of Electronics, Information and Communication Engineers, Information and Communication System Security, March 2014, [searched in Sep. 2, 2014], Internet <URL:http://www.ieice.org/ken/paper/20140327QB1Z/>

Non Patent Literature 4: Qi Wang, Jingyu Zhou, Yizhou Zhang, Jianjun Zhao, "Extracting URLs from JavaScript via Program Analysis", In Proceedings of the 9th joint meeting of the European Software Engineering Conference and the ACM SIGSOFT Symposium on the Foundations of Software Engineering, August 2013, [searched in Sep. 2, 2014], Internet <URL:http://stap.sjtu.edu.cn/images/2/2e/ExtractingAnalysis.pdf>

Non Patent Literature 5: Mark Weiser, "PROGRAM SLICING", In Proceedings of the 5th International Conference on Software Engineering, 1981, [searched in Sep. 2, 2014], Internet <URL:http://dl.acm.org/citation.cfm?id=802557>

SUMMARY

Technical Problem

The related art does not consider the transfer code and the content acquisition code which depend on the control statement of the code, and thus, has a problem that the transfer to the stepping-stone URL or the attack URL does not occur depending on the control statement of the code that performs the drive-by download attack, for example. As a result, there is a risk that the technique of detecting the malicious code does not effectively function and it is difficult to detect the malicious code.

For example, when version information of JRE (registered trademark) is acquired using the browser fingerprinting in a certain stepping-stone URL and a JavaScript (registered trademark) code added with control to execute the transfer code to the attack URL is used only for a JRE (registered trademark) version 7, it is difficult to execute the transfer code in client environment where JRE (registered trademark) is not installed and client environment where JRE (registered trademark) other than the JRE (registered trademark) version 7 is installed. As a result, the access from the client is not transferred to the stepping-stone URL or the attack URL, and thus, the technique of detecting the malicious code does not effectively function and it is difficult to detect the malicious code.

Thus, the present invention aims to solve the above-described problems and to analyze a code that performs a drive-by download attack depending on client environment.

Solution to Problem

To solve the above-described problems, the present invention is an analysis device that analyzes a code included in web content, the device comprising: a syntax analysis unit that searches a transfer code to another site or a content acquisition code from the code by performing syntax analysis of the code included in the web content and specifies at least any of an object and a function and a property of the object which are used in the transfer code or the content acquisition code found as a result of the search; and a program slicing unit which extracts a code having a dependence relationship with the transfer code or the content acquisition code based on at least any of the object and the function and the property of the object thus specified.

Advantageous Effects of Invention

According to the present invention, it is possible to analyze the code that performs the drive-by download attack depending on the client environment. As a result, it is possible to extract a URL which is highly likely to be used as an attack URL and a stepping-stone URL in the drive-by download attack from the code, for example.

BRIEF DESCRIPTION OF DRAWINGS

FIG. 3 is a diagram illustrating an example of a code as an analysis target of a program analysis unit.

FIG. 4 is a diagram illustrating examples of a transfer code and a content acquisition code.

FIG. 7 is a diagram illustrating an example of a slice.

FIG. 8 is a diagram illustrating an example of analysis information to be registered in a analysis information database.

FIG. 14 is a diagram illustrating an example of a code as an analysis target of a program analysis unit.

FIG. 15 is a diagram illustrating examples of a script transfer code, a tag transfer code, and a pair of an HTML tag used in the code and an attribute name thereof.

FIG. 19 is a diagram for describing a slice to be extracted by an execution path search unit.

FIG. 22 is a diagram illustrating an example of analysis information to be stored in the analysis information database.

DESCRIPTION OF EMBODIMENTS

Hereinafter, modes for implementing the present invention (embodiments) will be described with reference to the drawings. The present invention is not limited to the present embodiments.

[First Embodiment]

Figure 1:
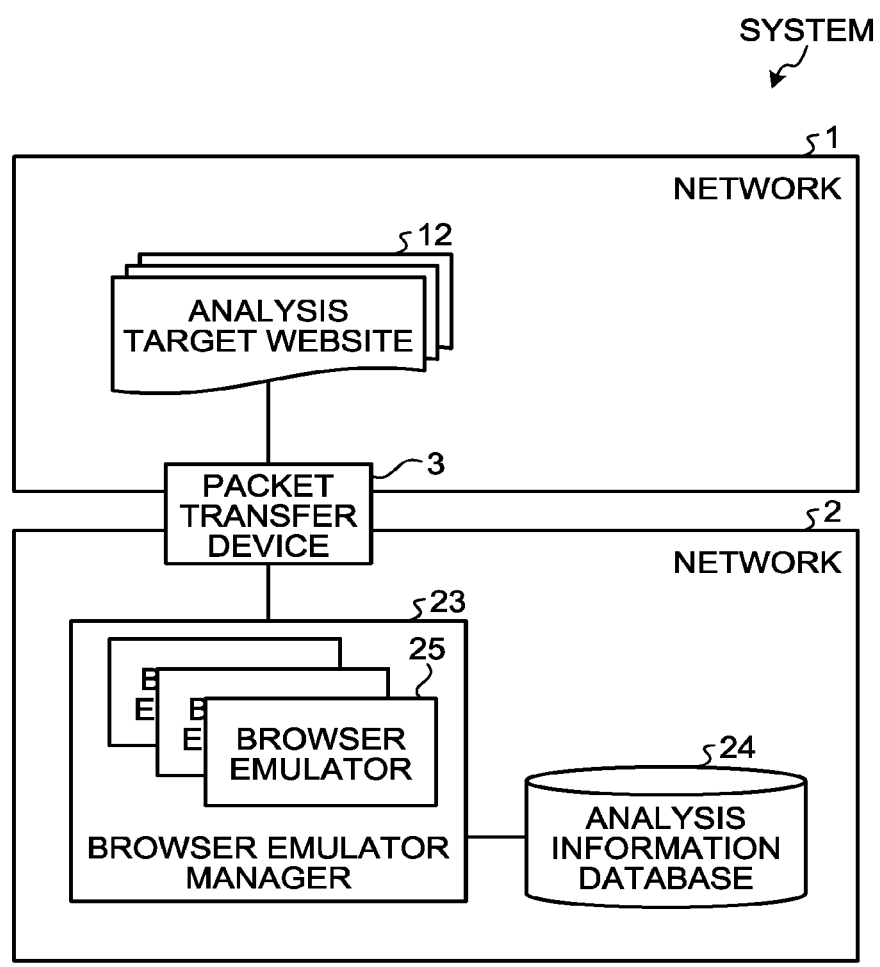
FIG. 1 is a diagram illustrating a configuration example of a system.

First, a configuration example of a system according to a first embodiment will be described with reference to FIG. 1. The system is provided with a network 1 and a network 2 as illustrated in FIG. 1, for example. The network 1 and the network 2 are connected via a packet transfer device 3.

The network 1 is provided with an analysis target website 12. The network 1 may be a wide area network such as the Internet, a small and medium-scale network such as a corporate network, or a network of ground environment or hosting environment.

The analysis target website 12 is a website serving as an analysis target of a browser emulator manager (analysis device) 23. Examples of the analysis target website 12 may include a website posted in a blacklist of published malicious websites, and the like.

In addition, the network 2 is provided with the browser emulator manager 23 and an analysis information database 24. The network 2 may be a small-scale network such as a local area network, a small and medium-scale network such as a corporate network, or a network of ground environment or hosting environment.

The browser emulator manager 23 manages one or more browser emulators 25 and causes the browser emulator 25 to access a predetermined website (the analysis target website 12). Further, the browser emulator manager 23 stores a URL of a website accessed by the browser emulator 25, and a URL or the like obtained by analyzing a code acquired from the website in the analysis information database 24.

The browser emulator 25 is a device which emulates an operation of a browser. For example, a browser emulator provided by Honeynet Project, HtmlUnit or Selenium which has been developed as an open source can be applied as the browser emulator 25. Details of the browser emulator 25 will be described later. Incidentally, the browser emulator 25 is drawn to be constructed inside the browser emulator manager 23 in FIG. 1, but may be constructed outside the browser emulator manager 23, of course.

The URL of the website accessed by the browser emulator 25, and the URL or the like obtained by analyzing the code acquired from the website are stored (saved) in the analysis information database 24. The data may be saved in the analysis information database 24 using an RDBMS (Relational DataBase Management System) or may be saved in a text format. Details of the analysis information database 24 will be described later.

Incidentally, the browser emulator 25, the browser emulator manager 23 and the analysis information database 24 are arranged in the same network in the present embodiment, but may be arranged in different networks. In addition, the existing cryptographic technology may be applied to encrypt communication information or the respective networks in which the respective devices are arranged or the respective configurations may be connected to each other via a VPN (Virtual Private Network) in order to securely connect the respective configurations.

Next, the browser emulator manager 23 and the browser emulator 25 will be described in detail with reference to FIG. 2. The browser emulator manager 23 is provided with the browser emulator 25 and a control unit 27. The control unit 27 causes the browser emulator 25 to operate on a host system 26. For example, an OS provided in the browser emulator manager 23 is used as the host system 26. Details of the control unit 27 will be described later.

(Browser Emulator)

Next, the browser emulator 25 will be described. The browser emulator 25 is provided with a client environment emulation unit 251, an access unit 252, an HTML/CSS (HyperText Markup Language/Cascading Style Sheets) parser 253, and a script interpreter 254.

The client environment emulation unit 251 sets information of client environment (for example, an OS, a browser, a plug-in, and the like) that needs to be emulated by the browser emulator 25.

The access unit 252 performs communication with a website (for example, the analysis target website 12 in FIG. 1) using HTTP (HyperText Transfer Protocol) or HTTPS (HyperText Transfer Protocol Secure) and acquires web content from the website. Here, the access unit 252 uses the client environment, set by the client environment emulation unit 251, as a User-Agent field of an HTTP header during the communication using the HTTP or HTTPS. In this manner, the browser emulator 25 emulates the client environment. For example, a cURL which has been developed as free software is used as the access unit 252.

In addition, the access unit 252 records a result of the access to the website in an access log. For example, the access unit 252 records a URL of the accessed website, date and time of the access in the access log. In addition, when transition to another website occurs as the result of the access to the website, the access unit 252 also records a URL of a transition destination or the like in the access log.

The HTML/CSS parser 253 interprets the web content acquired by the access unit 252. In addition, when a code is included in the web content as a result of the interpretation of the web content, the HTML/CSS parser 253 interprets the code using the script interpreter 254.

The script interpreter 254 interprets the code included in the web content. For example, when the code is written using JavaScript (registered trademark), the script interpreter 254 interprets the code using SpiderMonkey developed as an open source, a JavaScript (registered trademark) interpreter such as V8 JavaScript (registered trademark) Engine, Rhino which is a JavaScript (registered trademark) interpreter written in Java (registered trademark), or the like.

(Control Unit)

Next, the control unit 27 will be described. The control unit 27 is provided with a URL list creation unit 271, an access instruction unit 272, a program analysis unit 273, a registration processing unit 278, and a URL analysis unit 279.

The URL list creation unit 271 creates a bypass target URL list which is a URL list of websites (the analysis target website 12) that the respective browser emulators 25 bypass. For example, the URL list creation unit 271 creates the bypass target URL list based on URLs of websites posted in the blacklist of published malicious websites.

The access instruction unit 272 instructs the access unit 252 of each of the browser emulators 25 to access a URL listed in the bypass target URL list (URL list).

The program analysis unit 273 performs analysis of a program (code) included in web content acquired from a website as an access destination. Details of the program analysis unit 273 will be described later.

The registration processing unit 278 acquires each access log of the browser emulators 25 and registers the acquired access log in the analysis information database 24. In addition, the registration processing unit 278 registers a URL, obtained from the analysis (execution of a slice to be described later) of the code by the program analysis unit 273 in the analysis information database 24.

The URL analysis unit 279 analyzes a URL (analysis information) obtained from the access log stored in the analysis information database 24 or the code analysis, and outputs a result of the analysis. For example, the URL analysis unit 279 extracts a URL which is likely to be an attack URL or a stepping-stone URL from the URL included in the access log and the URL obtained by the code analysis and outputs the extracted URL.

Next, the program analysis unit 273 will be described in detail. The program analysis unit 273 is provided with a syntax analysis unit 274, a program dependence graph construction unit 275, a program slicing unit (extraction unit) 276, and a slice execution unit 277.

The syntax analysis unit 274 performs syntax analysis of a code included in web content acquired by the browser emulator 25. To be specific, the script interpreter 254 of the browser emulator 25 performs the syntax analysis of a script in the course of interpreting the script of the code included in the web content and searches a transfer code to another site or a content acquisition code from the code included in the web content. Further, the syntax analysis unit 274 specifies an object and a function and a property of the object to be used in the transfer code or the content acquisition code which has been found as a result of the search.

A specific example of the syntax analysis will be described. Here, a code as an analysis target is assumed to be a code written using JavaScript (registered trademark) as illustrated in FIG. 3, for example. Incidentally, the code illustrated in FIG. 3 is a code that executes a control command based on version information of JRE and then, executes the transfer code to execute transfer to another site or the content acquisition code to acquire content from another site. In addition, the transfer code and the content acquisition code serving as search targets of the syntax analysis unit 274 are assumed to be codes represented by reference sign 401 and reference sign 402 in FIG. 4. Incidentally, the content acquisition code represented by reference sign 402 is a code that acquires external content based on a URL to be assigned to a predetermined attribute name in a predetermined HTML tag. A pair of the HTML tag used in the content acquisition code and the attribute name that designates the URL of the external content is assumed to be a pair of an HTML tag and an attribute name represented by reference sign 403, for example. The information (search target code information) relating to these codes is stored in a predetermined area of a storage unit (not illustrated) of the browser emulator manager 23 and an administrator or the like thereof can be appropriately set.

Figure 5:
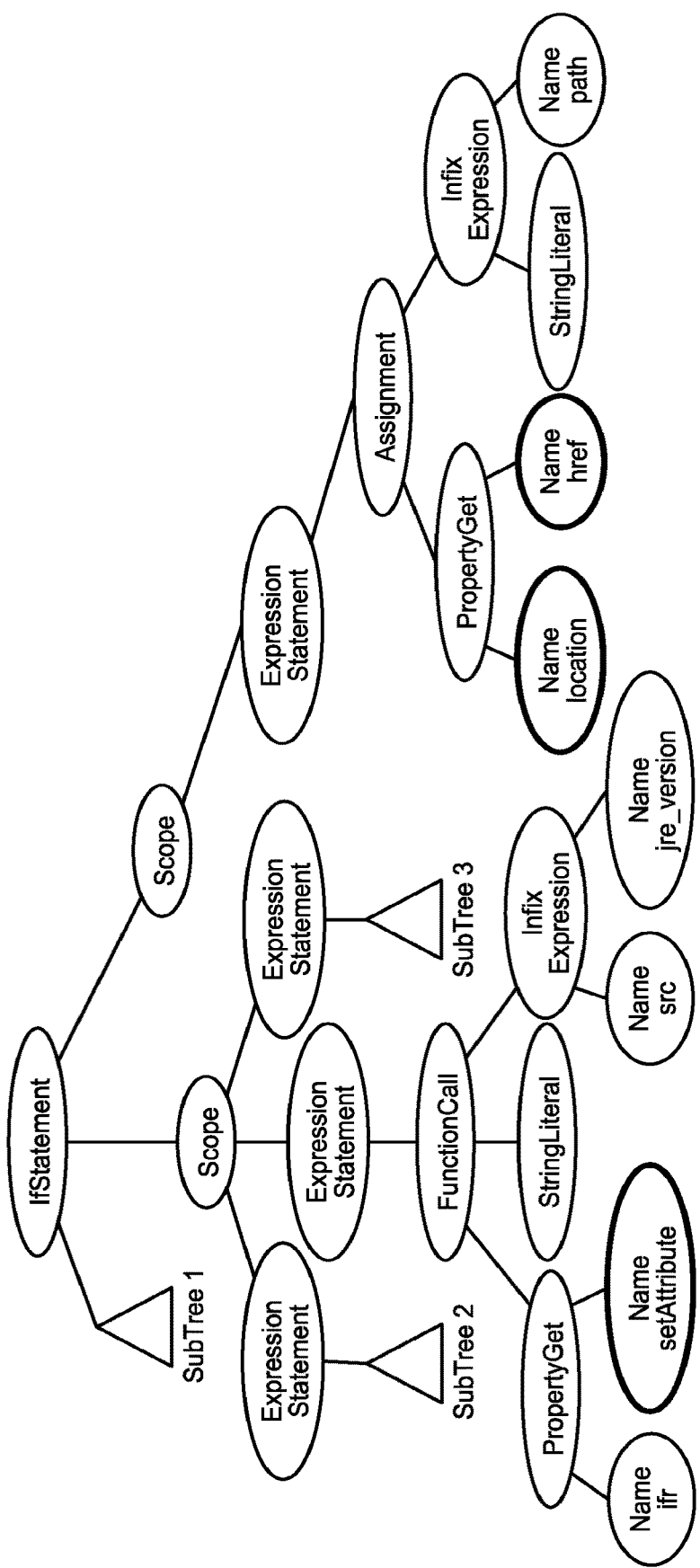
FIG. 5 is a diagram illustrating an example of an abstract syntax tree.

For example, the syntax analysis unit 274 converts a control statement section of the code in FIG. 3 (from the fifth to twelfth lines in FIG. 3) into an abstract syntax tree illustrated in FIG. 5 using an abstract syntax tree analysis function of a JavaScript (registered trademark) code loaded in the Rhino. A description will be given regarding a label described in each node (hereinafter, referred to as an AST node) in the abstract syntax tree.

If Statement means an if statement in JavaScript (registered trademark) and means a conditional statement, a THEN statement, and an ELSE statement from the left of a child AST node. Scope indicates a range ({ }) of a scope in the code, and ExpressionStatement indicates one line of a statement including semicolon (;) which represents end of the statement. FunctionCall included in the abstract syntax tree corresponding to the seventh line means execution of a function and includes a function name, an argument 1, an argument 2, and so on from the left of the child AST node. PropertyGet corresponding to the function name of FunctionCall means reference to a property of an object, and Name means an object name, the function name, or a property name. StringLiteral corresponding to the argument 1 of FunctionCall indicates a character string. Further, InfixExpression of the argument 2 means a binary operation and child AST nodes thereof indicate a left side and a right side, respectively. Assignment included in the abstract syntax tree corresponding to the eleventh line of the code in FIG. 3 means an assignment statement, and child AST nodes thereof means a left side and a right side, respectively. In addition, SubTrees 1 to 3 of triangular nodes in FIG. 5 include each abstract syntax tree similarly to other nodes, and SubTree 1 indicates a conditional statement in the fifth line of the code in FIG. 3, SubTree 2 indicates a statement in the sixth line of the code in FIG. 3, and SubTree 3 indicates a statement in the eighth line of the code in FIG. 3.

For example, the syntax analysis unit 274 searches an AST node (AST node of setAttribute, location, or href) emphasized using the bold line in FIG. 5 as an AST node relating to the transfer code and the content acquisition code illustrated in FIG. 4 from the abstract syntax tree illustrated in FIG. 5.

The syntax analysis unit 274 can specify an object and a function and a property of the object used in a transfer code or a content acquisition code that is not executed by the control statement by exhaustively searching the abstract syntax tree in this manner.

Incidentally, the syntax analysis unit 274 may perform syntax analysis of a code using a method other than the above-described method, of course.

Figure 2:
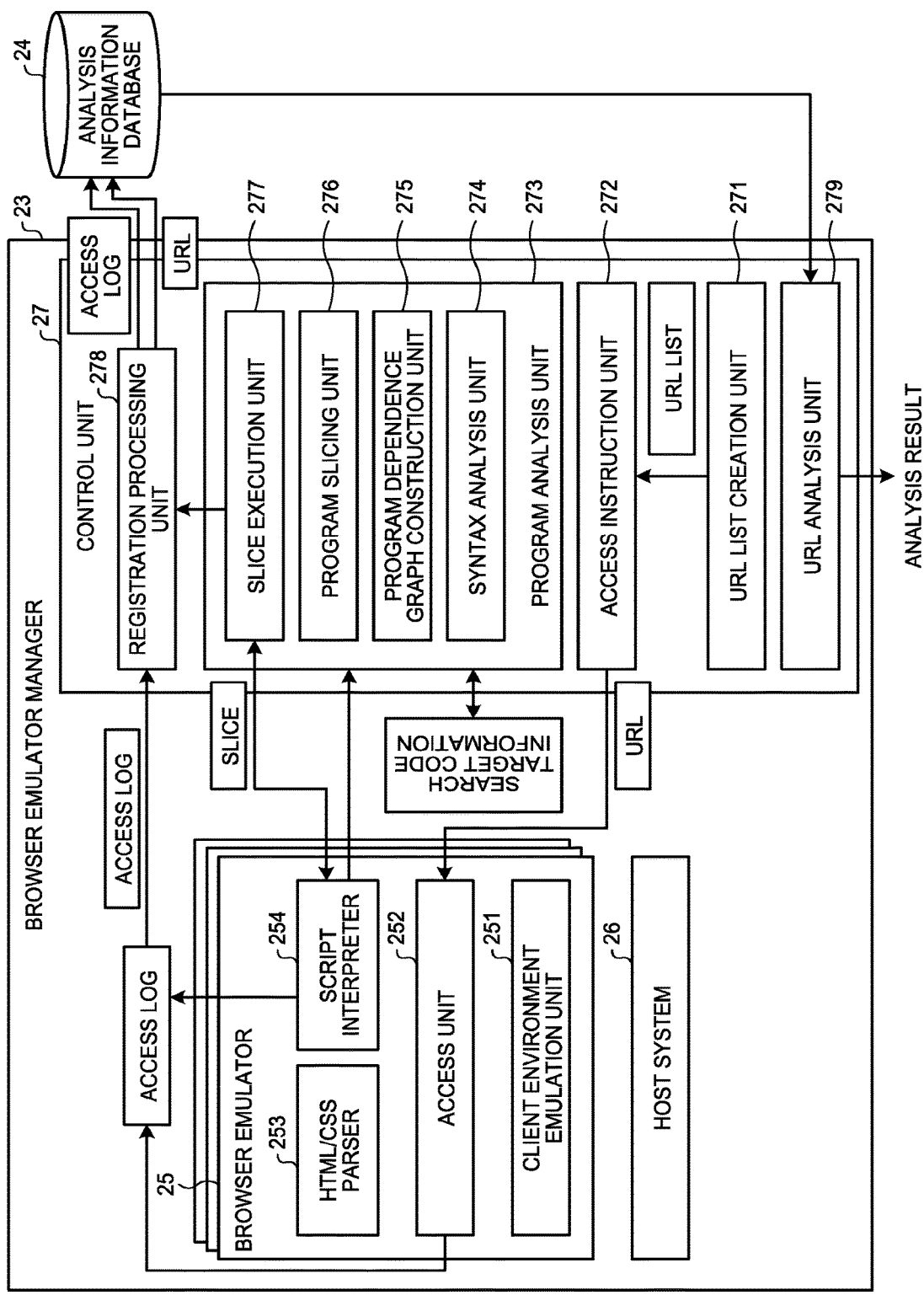
FIG. 2 is a diagram illustrating a configuration example of a browser emulator manager.

When a code as a search target (that is, a transfer code or a content acquisition code) has been found as a result of the search by the syntax analysis unit 274, the program dependence graph construction unit 275 of FIG. 2 constructs a program dependence graph, which indicates a data dependence relationship and a control dependence relationship between nodes, using each statement of the code acquired from the web content as the nodes. Further, the program dependence graph construction unit 275 specifies a node relating to the found transfer code or content acquisition code using the constructed program dependence graph.

For example, the program dependence graph construction unit 275 constructs a program dependence graph using a variable definition statement, an assignment statement, a function definition statement, a function execution statement, a return statement, a conditional branch statement, a loop statement, an exception handling statement or the like in the JavaScript (registered trademark) code as a node (hereinafter, referred to as a PDG node) in the program dependence graph and the data dependence relationship or the control dependence relationship between nodes as an edge (hereinafter, referred to as a PDG edge).

Figure 6:
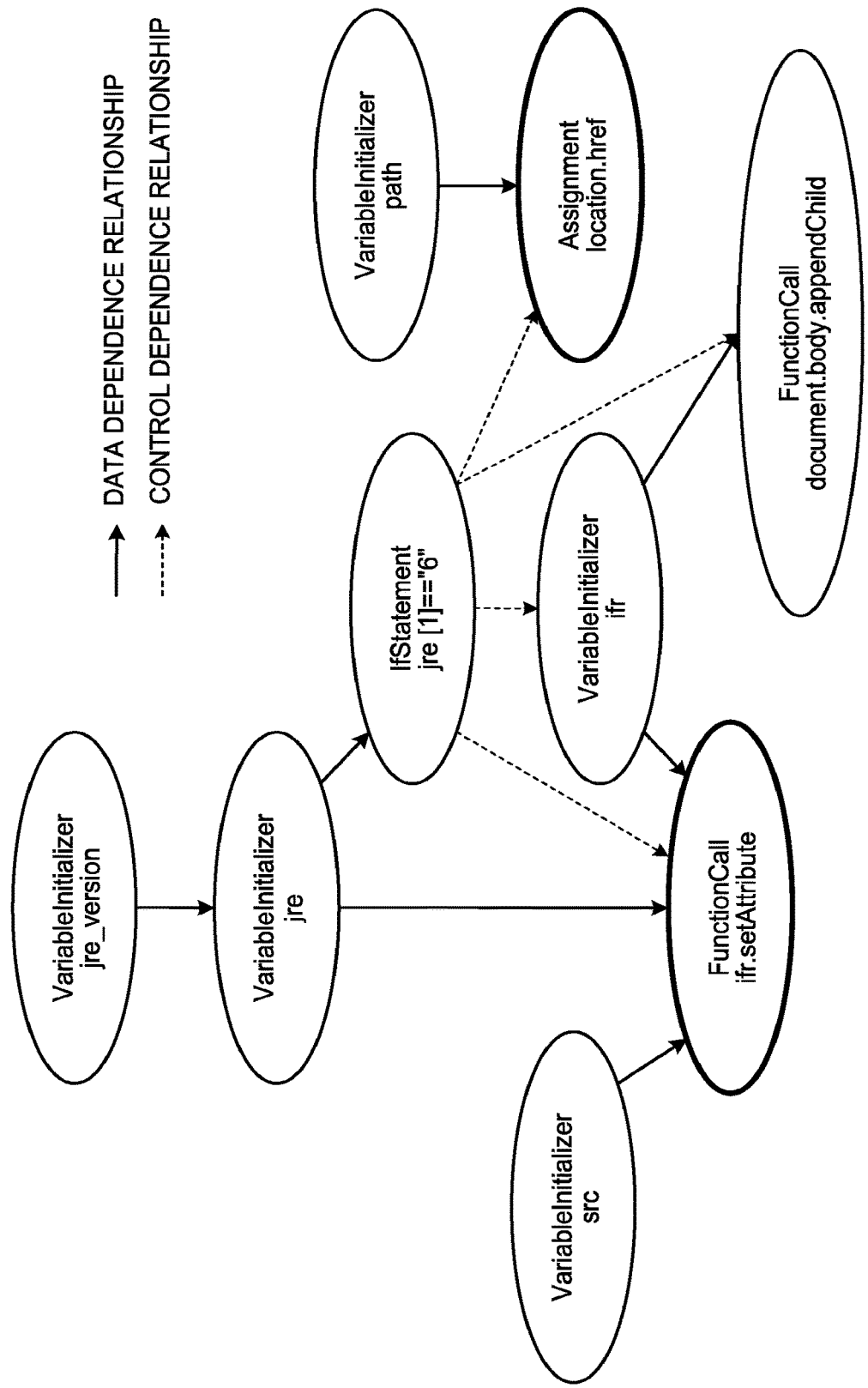
FIG. 6 is a diagram illustrating an example of a program dependence graph.

For example, the program dependence graph construction unit 275 constructs the program dependence graph illustrated in FIG. 6 using the code illustrated in FIG. 3. A description will be given regarding a label described in each PDG node in the program dependence graph illustrated in FIG. 6. VariableInitializer means definition of a variable and also describes a name of the variable as a definition target. IfStatement, Assignment, and FunctionCall have the same meaning as the respective labels of the abstract syntax tree illustrated in FIG. 5, and also describe a conditional statement, an object name, and a function name. In addition, the PDG edge represented by the solid arrow in the program dependence graph illustrated in FIG. 6 indicates the data dependence relationship, and the PDG edge represented by the dashed arrow indicates the control dependence relationship. For example, FunctionCall ifr.setAttribute has the data dependence relationship with VariableInitializer src, VariableInitializer jre, and VariableInitializer if r, and further has the control dependence relationship with IfStatement jre[1]=="6" in the program dependence graph illustrated in FIG. 6.

The program dependence graph construction unit 275 specifies the PDG node relating to the code (AST node) specified by the syntax analysis unit 274 from the above-described program dependence graph. For example, when the syntax analysis unit 274 specifies the AST nodes (setAttribute, location, and href) emphasized by the bold line in the abstract syntax tree illustrated in FIG. 5, the program dependence graph construction unit 275 specifies the PDG nodes (FunctionCall ifr.setAttribute and Assignment location.href) emphasized by the bold line in FIG. 6 as the PDG nodes relating to the AST nodes.

The program slicing unit 276 of FIG. 2 extracts a slice from the program dependence graph by setting a statement of the node (for example, the PDG node emphasized by the bold line in FIG. 6) in the program dependence graph specified by the program dependence graph construction unit 275 in the code acquired from the web content as a slicing criteria. That is, the program slicing unit 276 extracts a slice relating to the transfer code or the content acquisition code by applying reverse slicing using the data dependence relationship (see the solid arrow in FIG. 6) in the program dependence graph. Incidentally, the control dependence relationship in the program dependence graph is generally considered at the time of extracting a slice, but the program slicing unit 276 extracts a slice which does not depend on a control statement of a code by applying the reverse slicing upon consideration of the data dependence relationship without considering the control dependence relationship in the program dependence graph.

The program slicing unit 276 extracts a slice by setting the statements of the PDG nodes (FunctionCall ifr.setAttribute and Assignment location.href) emphasized by the bold line using the program dependence graph illustrated in FIG. 6, for example, as slicing criterion (setAttribute( ):<7,setAttribute> in the seventh line and location.href:<11,location.href> in the eleventh line of the code illustrated in FIG. 3). For example, the program slicing unit 276 extracts a statement having a data dependence relationship with the statement of setAttribute in the seventh line of the code illustrated in FIG. 3 as a slice based on the slicing criteria <7,setAttribute> (see reference sign 701→reference sign 702 in FIG. 7). Incidentally, the program slicing unit 276 also extracts a slice based on the slicing criteria <11, location.href> in the same manner although not described.

The slice execution unit 277 of FIG. 2 causes the slice extracted by the program slicing unit 276 to be executed in the script interpreter 254. That is, the slice execution unit 277 causes the script interpreter 254 to interpret the slice extracted by the program slicing unit 276, and monitors an argument of each value to be assigned to the object and the function and the property of the object used in the transfer code or the content acquisition code during the interpretation, and extracts a URL.

For example, it is considered a case in which the browser emulator 25 emulates client environment where a JRE (registered trademark) version 7 is installed. In this case, the slice execution unit 277 causes a slice represented by reference sign 702 of FIG. 7 to be executed in the script interpreter 254 of the browser emulator 25 and extracts a URL of http://example.com/exploit/?jre=7 from the monitored argument 2 of a function of setAttribute( ), for example, when monitoring the argument of each value assigned to the object and the function and the property of the object used in the transfer code or the content acquisition code.

However, the slice execution unit 277 executes a slice at a timing when read of a DOM (Document Object Model) is completed (for example, immediately before a DOMContentLoaded event in Firefox (registered trademark) or Google Chrome (registered trademark)) so as to enable execution of a code to operate the DOM. In addition, the slice execution unit 277 duplicates, for execution of a slice, DOM information (a structure or a value of a DOM tree) and context information (for example, the variable definition, the function definition, or the like) of JavaScript (registered trademark) at a point in time of executing the slice and discard the information after executing the slice such that a result of the slice execution does not affect processing of original JavaScript (registered trademark) or the like.

In addition, the access unit 252 of the browser emulator 25 further acquires web content by accessing a URL extracted by the slice execution (for example, a URL associated with "slice" of "1" in the analysis information illustrated in FIG. 8), and executes the script interpretation using the script interpreter 254 and each processing using the syntax analysis unit 274, the program dependence graph construction unit 275, the program slicing unit 276, and the slice execution unit 277 in the same manner as described above when a code is included in the acquired web content. That is, the browser emulator manager 23 performs recursive analysis with respect to the URL extracted by the slice execution. Accordingly, the browser emulator manager 23 can extract URLs which are likely to be the attack URL or the stepping-stone URL as many as possible.

Incidentally, whether to perform the recursive analysis with respect to the URL extracted by the slice execution as above using the browser emulator manager 23 may be appropriately set by an administrator of the system or the like depending on an object as a monitoring target, a property of the object, and a function.

(Analysis Information Database)

Next, the analysis information database 24 will be described. As described above, the analysis information database 24 stores the analysis information. An example of the analysis information is illustrated in FIG. 8 and is information which is associated with an analysis ID as identification information of the analysis information, "access URL" as a URL accessed when the browser emulator 25 accesses the URL of an analysis target website, "time stamp" representing date and time when the URL is accessed, "slice" indicating whether the URL is a URL extracted by the program slicing, and the like. Incidentally, the URL associated with the item of "slice" as "1" in the analysis information represents that the URL is the URL extracted by the program slicing, and a URL associated with the item of "slice" as "0" represents that the URL is not the URL extracted by the program slicing. In addition, "access URL" includes not only the URL of the analysis target website but also a URL of a website transferred by the access to the URL. Incidentally, the analysis information may include information other than above-described information, of course.

According to the system described above, the code acquired from the web content is exhaustively searched, and the transfer code or the content acquisition code is specified. Further, the URL is extracted from the transfer code or the content acquisition code thus specified. As a result, the system can extract the URL which is likely to be the attack URL or the stepping-stone URL in the drive-by download attack performed depending on the client environment.

(Processing Procedure)

Figure 9:
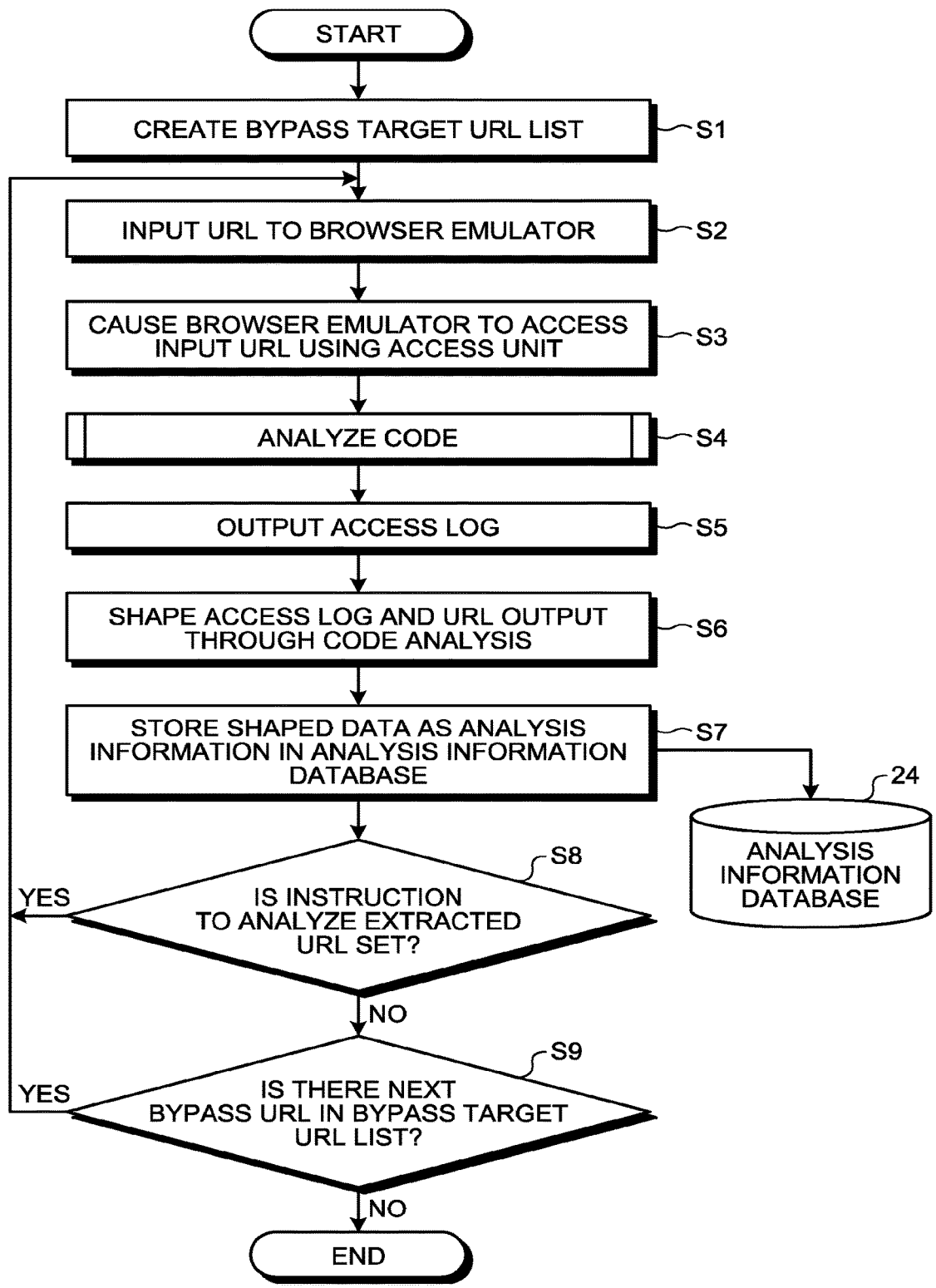
FIG. 9 is a flowchart illustrating an example of a processing procedure of a system.

Next, an example of a processing procedure of the system will be described with reference to FIG. 9. First, the URL list creation unit 271 creates the bypass target URL list (S1). For example, the URL list creation unit 271 creates the bypass target URL list based on the blacklist of published malicious websites.

Further, the access instruction unit 272 inputs a URL in the bypass target URL list to the browser emulator 25 (S2), and the browser emulator 25 accesses the URL input in S2 using the access unit 252 (S3). Further, the access unit 252 acquires web content from the URL as the access destination.

Incidentally, the access instruction unit 272 may cause the single browser emulator 25 to access a plurality of URLs or cause the plurality of browser emulators 25 to access URLs different from each other in S2.

After S3, the HTML/CSS parser 253 of the browser emulator 25 interprets the acquired web content, the script interpreter 254 interprets a code when the code is included in the acquired web content, and the program analysis unit 273 analyzes the code (S4). Details of the code analysis will be described later.

After S4, the access unit 252 outputs the access log (S5). That is, the access unit 252 outputs a result of the access to the URL input by the access instruction unit 272 as the access log. Further, the registration processing unit 278 shapes the access log output in S5 and the URL output through the code analysis in S4 (S6) and stores the shaped data in the analysis information database 24 (see FIG. 8) (S7).

Here, if an instruction to analyze the URL extracted by the slice execution of the slice execution unit 277 is set (Yes in S8), the access instruction unit 272 reads the URL extracted by the slice execution from the analysis information of the analysis information database 24 and performs the processes of S2 and the subsequent steps using the URL as a URL which is a bypass target URL. That is, the browser emulator manager 23 performs the recursive analysis with respect to the URL extracted by the slice execution.

Incidentally, if the instruction to analyze the URL extracted by the slice execution is not set in S8 (No in S8) and there is the next bypass URL in the bypass target URL list (Yes in S9), the process returns to S2. On the other hand, if there is no next bypass URL in the bypass target URL list (No in S9), the process is ended.

When the analysis information is stored in the analysis information database 24 in the above-described manner, the URL analysis unit 279 performs an analyzing process of URLs in the analysis information to extract a URL which is highly likely to be the attack URL or the stepping-stone URL, for example.

Next, the code analyzing process in S4 of FIG. 9 will be described in detail with reference to FIG. 10 and FIG. 11. Here, the description will be given by exemplifying a case in which the abstract syntax tree (see FIG. 5) is used when the syntax analysis unit 274 performs the syntax analysis of a code.

Figure 10:
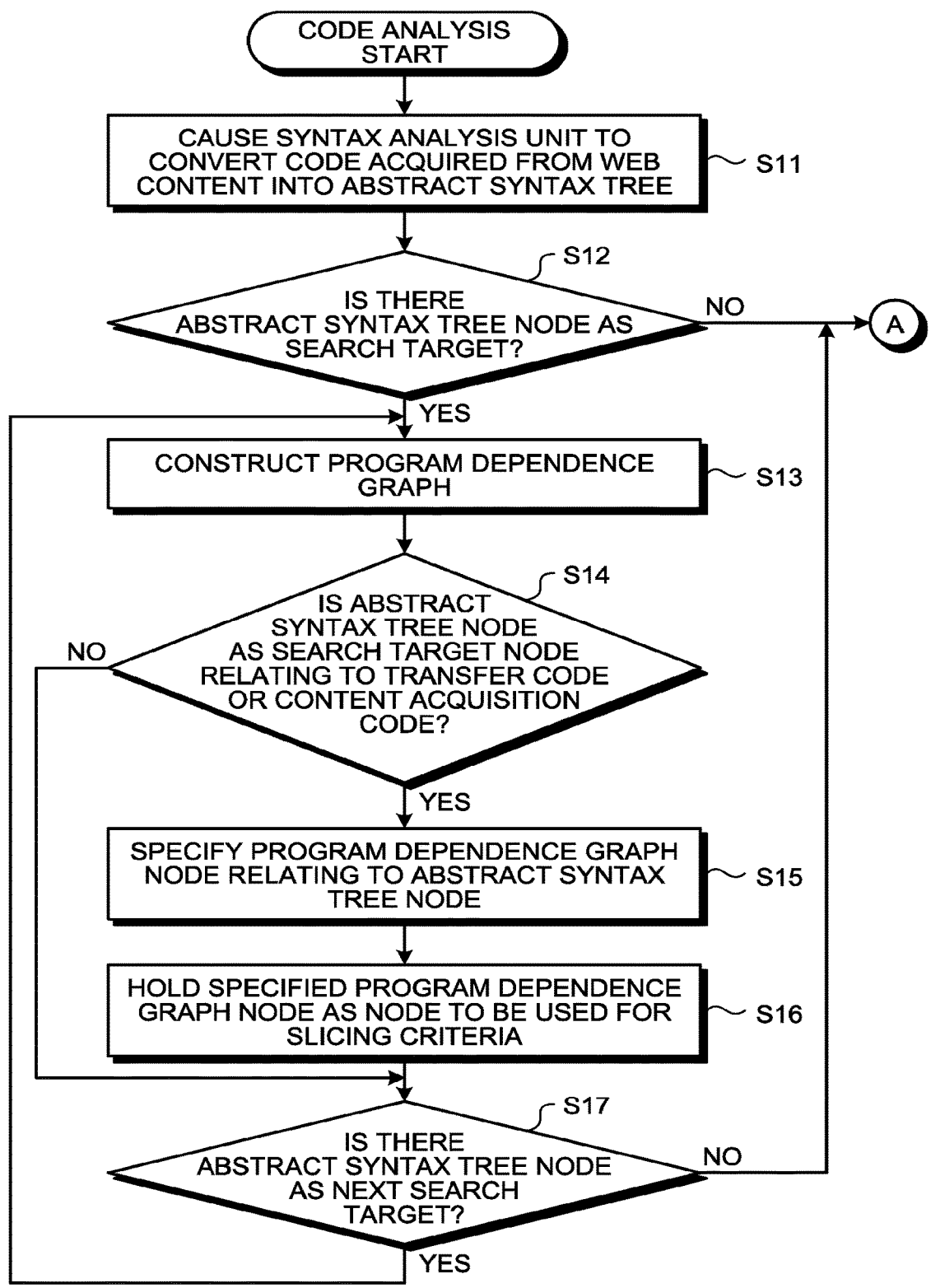
FIG. 10 is a flowchart illustrating an example of a processing procedure of code analysis of FIG. 9.

First, the syntax analysis unit 274 converts the code acquired from the web content into the abstract syntax tree (see FIG. 5) (S11 in FIG. 10). Here, if there is an abstract syntax tree node as a search target in the abstract syntax tree (Yes in S12), the program dependence graph construction unit 275 constructs the program dependence graph (see FIG. 6) (S13). On the other hand, there is no abstract syntax tree node as the search target in the abstract syntax tree (No in S12), the process proceeds to S18 in FIG. 11.

In addition, if the abstract syntax tree node as the search target is a node relating to the transfer code or the content acquisition code (Yes in S14) after S13, the program dependence graph construction unit 275 specifies a program dependence graph node relating to the abstract syntax tree node (S15). Further, the program dependence graph construction unit 275 holds the program dependence graph node specified in S15 as a node to be used for the slicing criteria (S16). On the other hand, if the abstract syntax tree node as the search target is a node relating to neither the transfer code nor the content acquisition code in S14 (No in S14), the process proceeds to S17.

In S17, the program dependence graph construction unit 275 determines that there is an abstract syntax tree node as the next search target (Yes in S17), the process proceeds to S13. On the other hand, when it is determined that there is no abstract syntax tree node as the next search target (No in S17), the process proceeds to S18 of FIG. 11.

Figure 11:
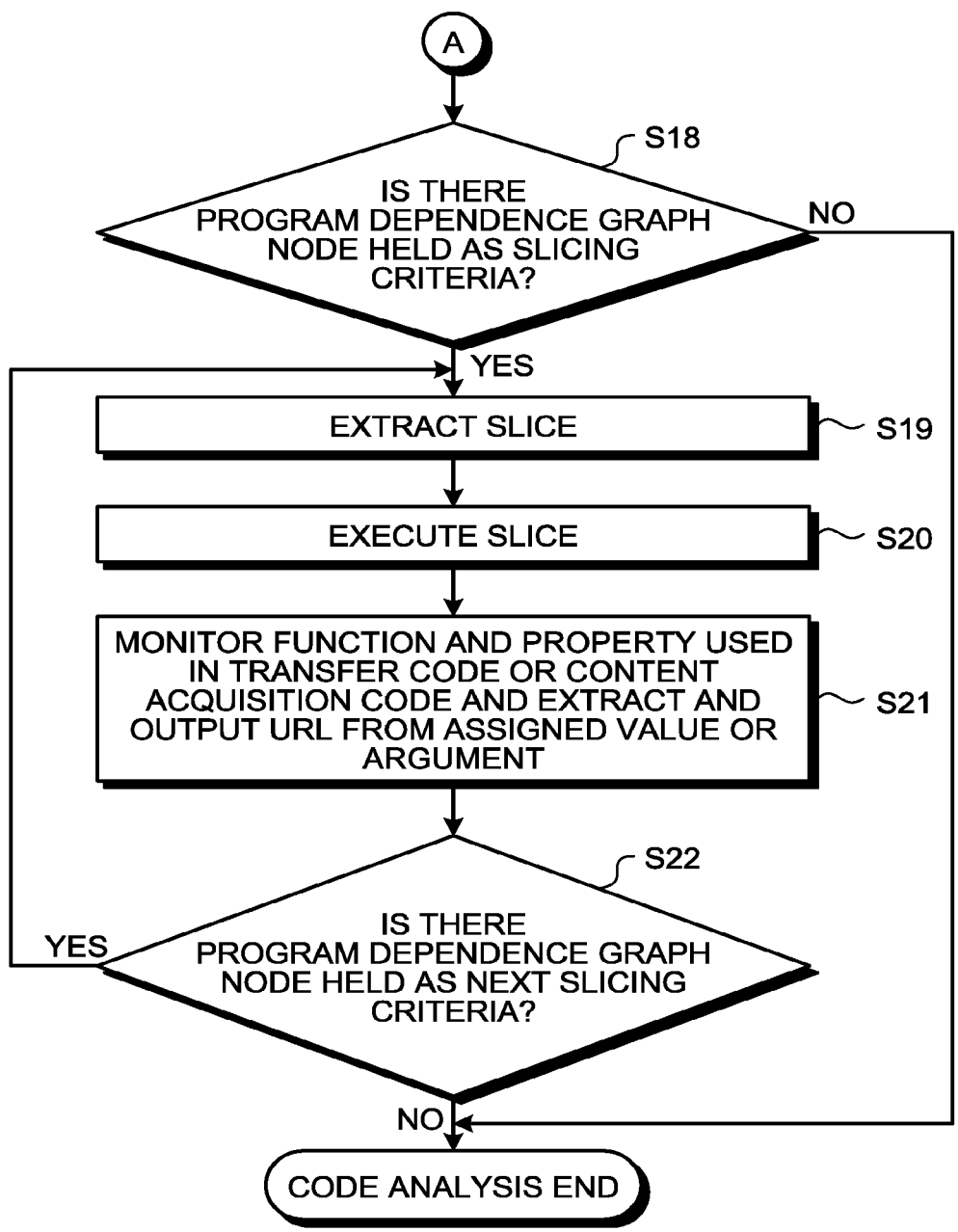
FIG. 11 is a flowchart illustrating an example of the processing procedure of the code analysis of FIG. 9.

In S18 of FIG. 11, when the program dependence graph construction unit 275 determines that there is the program dependence graph node held as the slicing criteria (Yes in S18), the program slicing unit 276 extracts a slice using a statement of the program dependence graph node held in S16 as the slicing criteria (S19). Incidentally, the program dependence graph construction unit 275 determines that there is no program dependence graph node held as the slicing criteria in S18 (No in S18), the process is ended.

After S19, the slice execution unit 277 executes the slice extracted in S19 (S20) and extracts and outputs a URL from values or arguments to be assigned to an object and a function and a property of the object used in the transfer code or the content acquisition code (S21). After S21, the process returns to S19 when the program dependence graph node as the next slicing criteria is still present (Yes in S22) or is ended when there is no program dependence graph node as the next slicing criteria (No in S22).

According to the system described above, the code acquired from the web content is exhaustively searched, and the transfer code or the content acquisition code is specified. Further, the URL is extracted from the transfer code or the content acquisition code thus specified. As a result, the system can extract the URL which is likely to be the attack URL or the stepping-stone URL in the drive-by download attack performed depending on the client environment.

Incidentally, the object and the function and the property of the object specified by the syntax analysis unit 274 are not limited to those relating to the transfer code or the content acquisition code, but may be appropriately changed depending on a purpose.

In addition, the statement set as the program dependence graph node in the program dependence graph among the statements of the JavaScript (registered trademark) code in the program dependence graph construction unit 275 is assumed as the variable definition statement, the assignment statement, the function definition statement, the function execution statement, the return statement, the conditional branch statement, the loop statement, the exception handling statement, or the like, but any addition or change may be made by the administrator of the system or the like other than the above-described statements.

Incidentally, the information output as the result of the code analysis by the program analysis unit 273 may be information other than the URL. For example, when the information on an object and a function and a property of the object used in an attack code is known in advance, the program analysis unit 273 may specify the attack code using the information and output the various types of information used in the specified attack code.

In addition, the system is assumed to access the analysis target website 12 using the browser emulator 25, but may access the analysis target website 12 using a configuration other than the browser emulator 25 (for example, the actual client environment).

In addition, the program slicing unit 276 of the system is assumed to extract the slice based on the data dependence relationship without considering the control dependence relationship in the program dependence graph constructed by the program dependence graph construction unit 275, but is not limited thereto. For example, the program slicing unit 276 may extract a slice using a part of the control dependence relationship in the program dependence graph and the data dependence relationship. Further, the program slicing unit 276 is assumed to extract the slice using the program dependence graph, but may not use the program dependence graph as long as it is possible to grasp the control dependence relationship and the data dependence relationship of each code.

[Second Embodiment]

Figure 12:
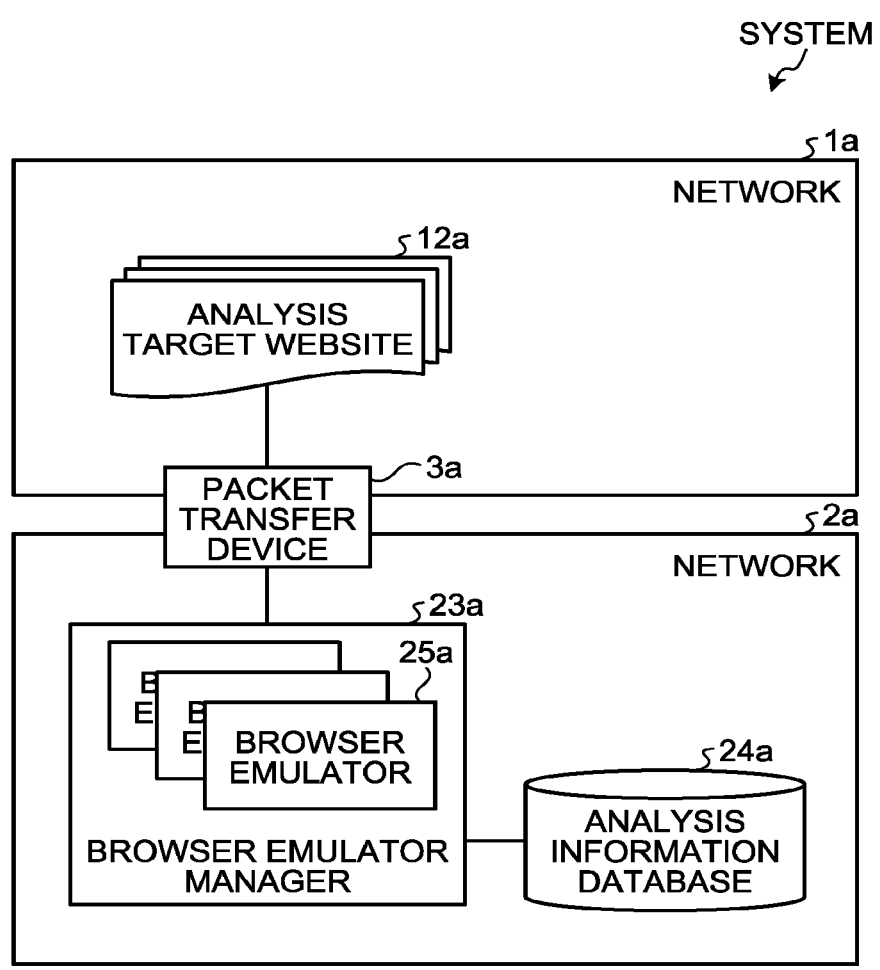
FIG. 12 is a diagram illustrating a configuration example of a system.

Next, a configuration example of a system according to a second embodiment will be described with reference to FIG. 12. In the second embodiment, the description will be given regarding a method of extracting a slice considering a control dependence relationship and a method of specifying client environment required for transfer. The second embodiment is characterized by including an execution path search unit 270a, which extracts a slice for each execution path to exhaustively extract URLs when the execution path is included in the extracted slice, and a program slicing unit 276a which adds a node representing a conditional branch statement in a program dependence graph as a slicing criteria to specify the client environment required for transfer to an extracted URL which is likely to be an attack URL or a stepping-stone URL. The system is provided with a network 1a and a network 2a as illustrated in FIG. 12, for example. The network 1a and the network 2a are connected via a packet transfer device 3a.

The network 1a is provided with an analysis target website 12a. The network 1a may be a wide area network such as the Internet, a small and medium-scale network such as a corporate network, or a network of ground environment or hosting environment.

The analysis target website 12a is a website serving as an analysis target of a browser emulator manager (analysis device) 23a. Examples of the analysis target website 12a may include a website posted in a blacklist of published malicious websites, and the like.

In addition, the network 2a is provided with the browser emulator manager 23a and an analysis information database 24a. The network 2a may be a small-scale network such as a local area network, a small and medium-scale network such as a corporate network, or a network of ground environment or hosting environment.

The browser emulator manager 23a manages one or more browser emulators 25a and causes the browser emulator 25a to access a predetermined website (the analysis target website 12a). Further, the browser emulator manager 23a stores a URL of a website accessed by the browser emulator 25a, and a URL or the like obtained by analyzing a code acquired from the website in the analysis information database 24a.

The browser emulator 25a is a device which emulates an operation of a browser. For example, a browser emulator (see http://www.honeynet.org/node/827) provided by Honeynet Project, HtmlUnit or Selenium which has been developed as an open source can be applied as the browser emulator 25a. Details of the browser emulator 25a will be described later. Incidentally, the browser emulator 25a is drawn to be constructed inside the browser emulator manager 23a in FIG. 12, but may be constructed outside the browser emulator manager 23a, of course.

The URL of the website accessed by the browser emulator 25a, and the URL or the like obtained by analyzing the code acquired from the website are stored (saved) in the analysis information database 24a. The data may be saved in the analysis information database 24a using an RDBMS (Relational DataBase Management System) or may be saved in a text format. Details of the analysis information database 24a will be described later.

Incidentally, the browser emulator 25a, the browser emulator manager 23a and the analysis information database 24a are arranged in the same network in the present embodiment, but may be arranged in different networks. In addition, the existing cryptographic technology may be applied to encrypt communication information or the respective networks in which the respective devices are arranged or the respective configurations may be connected to each other via a VPN (Virtual Private Network) in order to securely connect the respective configurations.

Next, the browser emulator manager 23a and the browser emulator 25a will be described in detail with reference to FIG. 13. The browser emulator manager 23a is provided with the browser emulator 25a and a control unit 27a. The control unit 27a causes the browser emulator 25a to operate on a host system 26a. For example, an OS provided in the browser emulator manager 23a is used as the host system 26a. Details of the control unit 27a will be described later.

(Browser Emulator)

Next, the browser emulator 25a will be described. The browser emulator 25a is provided with a client environment emulation unit 251a, an access unit 252a, an HTML/CSS (HyperText Markup Language/Cascading Style Sheets) parser 253a, and a script interpreter 254a.

The client environment emulation unit 251a sets information of client environment (for example, an OS, a browser, a plug-in, and the like) that needs to be emulated by the browser emulator 25a.

The access unit 252a performs communication with a website (for example, the analysis target website 12a in FIG. 12) using HTTP (HyperText Transfer Protocol) or HTTPS (HyperText Transfer Protocol Secure) and acquires web content from the website. Here, the access unit 252a uses the client environment, set by the client environment emulation unit 251a, as a User-Agent field of an HTTP header during the communication using the HTTP or HTTPS. In this manner, the browser emulator 25a emulates the client environment. For example, a cURL which has been developed as free software is used as the access unit 252a.

In addition, the access unit 252a records a result of the access to the website in an access log. For example, the access unit 252a records a URL of the accessed website, date and time of the access in the access log. In addition, when transition to another website occurs as the result of the access to the website, the access unit 252a also records a URL of a transition destination or the like in the access log.

The HTML/CSS parser 253a is a content parser that interprets the web content acquired by the access unit 252a. In addition, when a code is included in the web content as a result of the interpretation of the web content, the HTML/CSS parser 253a interprets the code using the script interpreter 254a.

The script interpreter 254a interprets the code included in the web content. For example, when the code is written using JavaScript (registered trademark), the script interpreter 254a interprets the code using SpiderMonkey developed as an open source, a JavaScript (registered trademark) interpreter such as V8 JavaScript (registered trademark) Engine, Rhino which is a JavaScript (registered trademark) interpreter written in Java (registered trademark), or the like.

(Control Unit)

Next, the control unit 27a will be described. The control unit 27a is provided with a URL list creation unit 271a, an access instruction unit 272a, a program analysis unit 273a, a registration processing unit 278a, and a URL analysis unit 279a.

The URL list creation unit 271a creates a bypass target URL list which is a URL list of websites (the analysis target website 12a) that the respective browser emulators 25a bypass. For example, the URL list creation unit 271a creates the bypass target URL list based on URLs of websites posted in the blacklist of published malicious websites.

The access instruction unit 272a instructs the access unit 252a of each of the browser emulators 25a to access a URL listed in the bypass target URL list (URL list).

The program analysis unit 273a performs analysis of a program (code) included in web content acquired from a website as an access destination. Details of the program analysis unit 273a will be described later.

The registration processing unit 278a acquires each access log of the browser emulators 25a and registers the acquired access log in the analysis information database 24a. In addition, the registration processing unit 278a registers a URL or client environment information (environment information), obtained from the analysis (execution of a slice to be described later) of the code by the program analysis unit 273a in the analysis information database 24a.

The URL analysis unit 279a analyzes a URL (analysis information) obtained from the access log stored in the analysis information database 24a or the code analysis, and outputs a result of the analysis. For example, the URL analysis unit 279a extracts a URL which is likely to be an attack URL or a stepping-stone URL from the URL included in the access log and the URL obtained by the code analysis and outputs the extracted URL.

(Program Analysis Unit)

Next, the program analysis unit 273a will be described in detail. The program analysis unit 273a is provided with a syntax analysis unit 274a, a program dependence graph construction unit 275a, the program slicing unit 276a, a slice execution unit 277a, and the execution path search unit 270a.

The syntax analysis unit 274a performs syntax analysis of a code included in web content acquired by the browser emulator 25a. To be specific, the script interpreter 254a of the browser emulator 25a performs the syntax analysis of a script in the course of interpreting the script of the code included in the web content and specifies a transfer code to another site from the code included in the web content.

A specific example of the syntax analysis will be described. Here, a code as an analysis target is assumed to be a code written using JavaScript (registered trademark) as illustrated in FIG. 14, for example. Incidentally, the code illustrated in FIG. 14 is a script transfer code which executes a conditional branch statement based on version information of Java (registered trademark) installed in a client and then executes transfer to another website. In addition, the transfer code as a target to be specified by the syntax analysis unit 274a is assumed to be a script transfer code represented by a reference sign 401a in FIG. 15, for example. Incidentally, a tag transfer code represented by reference sign 402a in FIG. 15 is a code that acquires external content based on a URL to be assigned to a predetermined attribute name in a predetermined HTML tag. A pair of the HTML tag used in the tag transfer code and the attribute name that designates the URL of the external content is assumed to be a pair of an HTML tag and an attribute name represented by reference sign 403a in FIG. 15, for example. The information (specifying target code information) relating to these codes is stored in a predetermined area of a storage unit (not illustrated) of the browser emulator manager 23a and a system administrator or the like thereof can be appropriately set.

For example, the syntax analysis unit 274a converts the code into tree structure data using an abstract syntax tree and specifies the transfer code by searching the tree structure data. Incidentally, a technique in Non Patent Literature 3, for example, may be used as an analysis method for the data conversion using the abstract syntax tree and the specifying of the transfer code. The syntax analysis unit 274a specifies an object and a function and a property of the object used in the transfer code illustrated in FIG. 15, for example, by exhaustively searching the abstract syntax tree. In the code illustrated in FIG. 14, location.href in the fourteenth line becomes the specifying target.

Incidentally, the syntax analysis unit 274a may perform syntax analysis using a method other than the above-described method, of course. In addition, FIG. 14 and FIG. 15 are mere the examples illustrated to describe the program analysis unit 273a, and the invention is not limited thereto.

Figure 13:
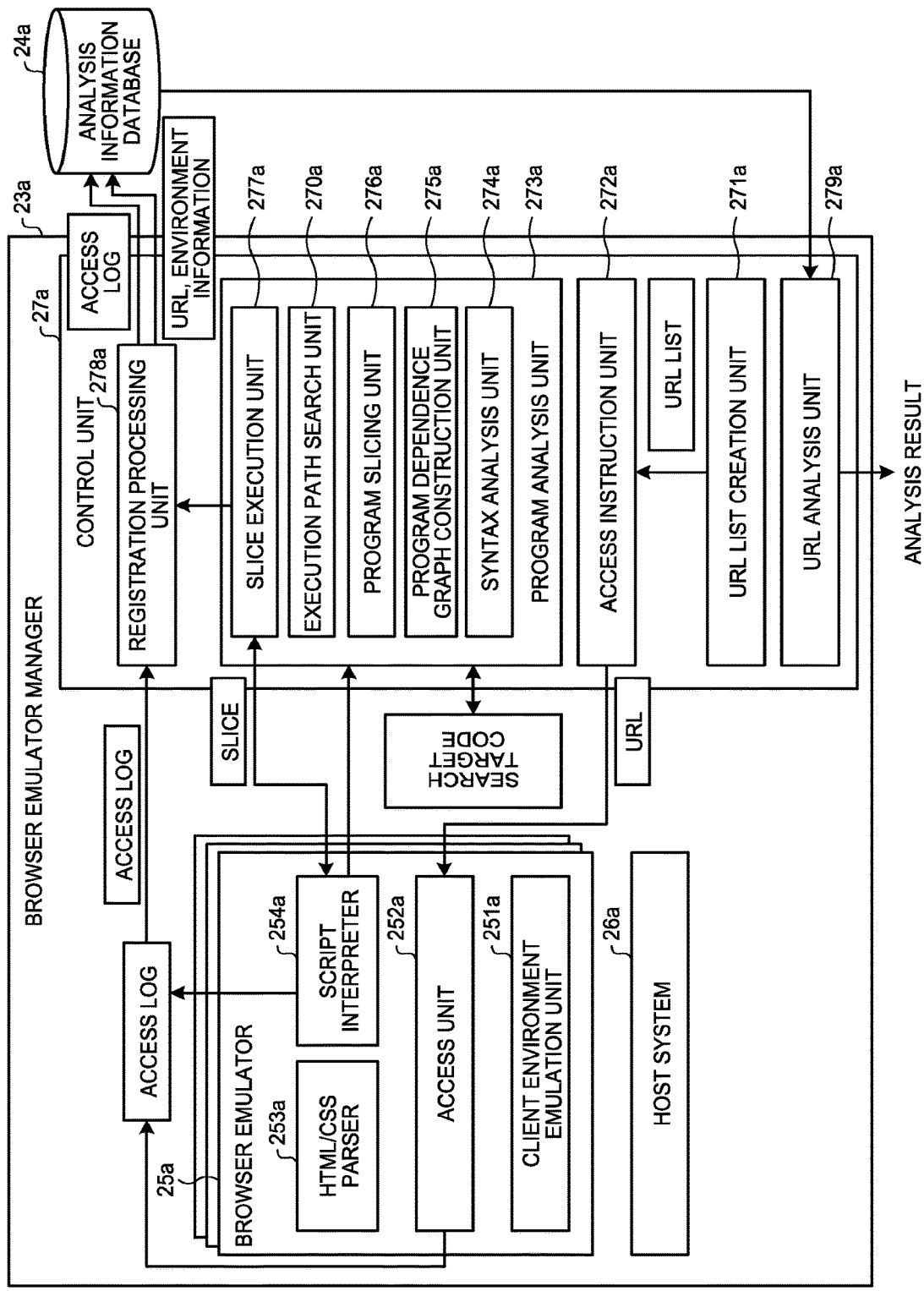
FIG. 13 is a diagram illustrating a configuration example of a browser emulator manager.

The program dependence graph construction unit 275a of FIG. 13 constructs a program dependence graph, which indicates a data dependence relationship and a control dependence relationship between nodes, using each statement of the code acquired from the web content as the nodes during the syntax analysis using the syntax analysis unit 274a. Further, the program dependence graph construction unit 275a specifies a node relating to the transfer code specified by the syntax analysis unit 274a using the constructed program dependence graph.

For example, the program dependence graph construction unit 275a constructs a program dependence graph using a variable definition statement, an assignment statement, a function definition statement, a function execution statement, a return statement, a conditional branch statement, a loop statement, an exception handling statement or the like in the JavaScript (registered trademark) code as a node (hereinafter, referred to as a PDG node) in the program dependence graph and the data dependence relationship or the control dependence relationship between nodes as an edge (hereinafter, referred to as a PDG edge).

Figure 16:
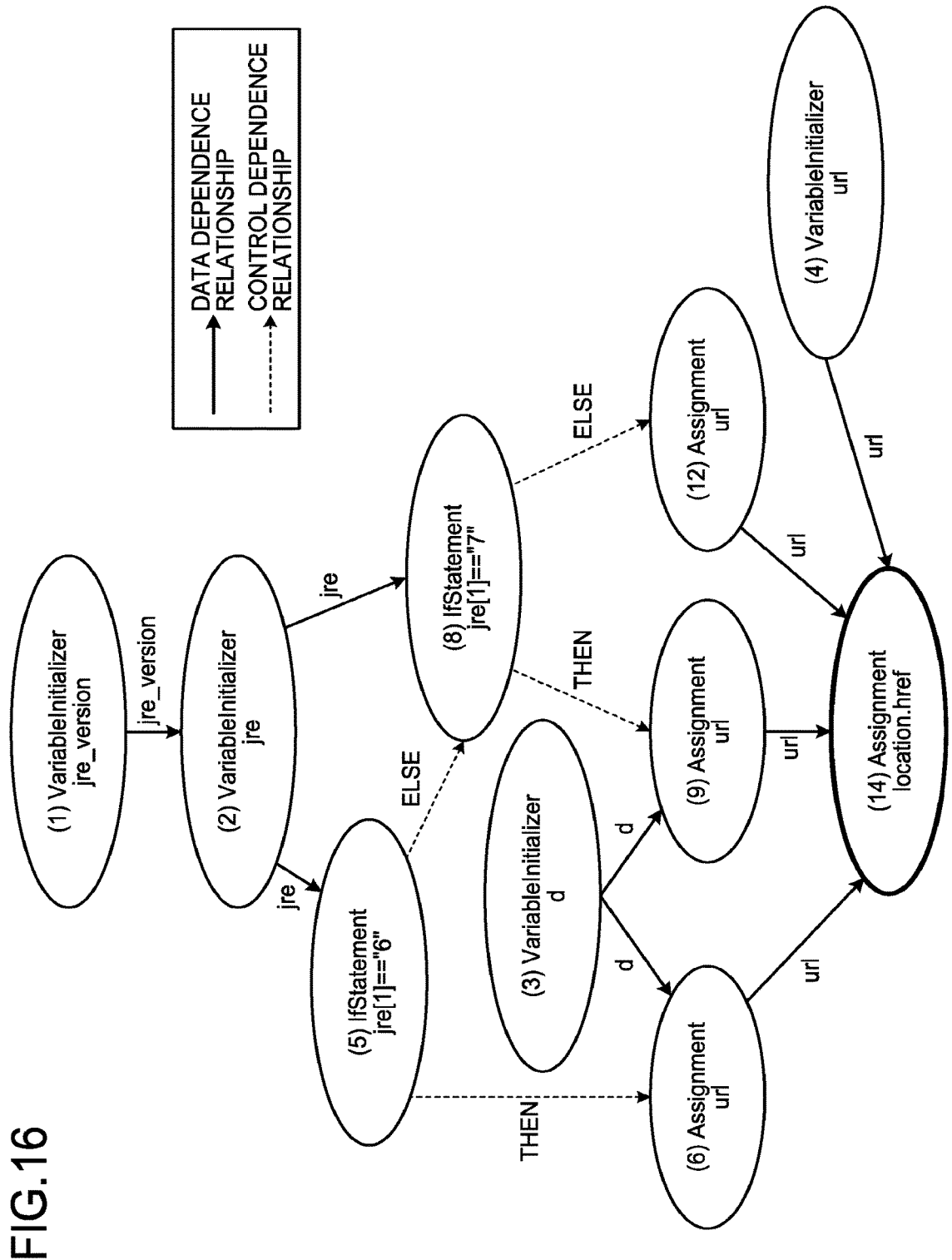
FIG. 16 is a diagram illustrating an example of a program dependence graph.

For example, the program dependence graph construction unit 275a constructs the program dependence graph illustrated in FIG. 16 using the code illustrated in FIG. 14. A description will be given regarding a label described in each PDG node in the program dependence graph illustrated in FIG. 16. VariableInitializer means definition of a variable and also describes a name of the variable as a definition target. IfStatement and Assignment, respectively, indicate a conditional statement and variable assignment, and also describe a conditional expression and a variable name. In addition, a number attached to the PDG node indicates a line number of the code illustrated in FIG. 14. The PDG edge represented by the solid arrow in the program dependence graph illustrated in FIG. 16 indicates the data dependence relationship, and the PDG edge represented by the dashed arrow indicates the control dependence relationship.

For example, IfStatement jre[1]=="6" represents to have a data dependence relationship with VariableInitializer jre, and further, IfStatement jre[1]=="6" represents to have a control dependence relationship with Assignment url and IfStatement jre[1]=="7" in the program dependence graph illustrated in FIG. 16.

The program dependence graph construction unit 275a specifies the PDG node relating to the code specified by the syntax analysis unit 274a from the above-described program dependence graph. For example, when the syntax analysis unit 274a specifies location.href in the fourteenth line from the code illustrated in FIG. 14, the program dependence graph construction unit 275a specifies a PDG node (Assignment location.href) emphasized by the bold line in FIG. 16.

The program slicing unit 276a of FIG. 13 extracts a slice from the program dependence graph by setting a statement of the node (for example, the PDG node emphasized by the bold line in FIG. 16) of the program dependence graph specified by the program dependence graph construction unit 275a in the code acquired from the web content as a slicing criteria.

In general, the data dependence relationship and the control dependence relationship in the program dependence graph are recursively traced at the time of extracting a slice. However, the program slicing unit 276a according to the present embodiment first recursively traces the data dependence relationship in the program dependence graph to extract a statement (node) relating to the reference to the variable definition, and then, traces the control dependence relationship a predetermined number of times or less (for example, once) to extract a statement relating to a control flow of the extracted statement, and slices the extracted statement. At this time, when a function definition statement (function statement) is included in the extracted slice, the program slicing unit 276a extracts the function call statement together. In addition, when the function definition statement includes an argument, the program slicing unit 276a also extracts a statement relating to the argument of the function call statement in the same manner.

Incidentally, the reason why the control dependence relationship is traced the predetermined number of times or less (for example, once) is because there is a possibility that a statement hardly relating to a slicing criteria (focused statement, for example, Assignment location.href in FIG. 16) if the control dependence relationship is recursively traced. That is, the program slicing unit 276a according to the present embodiment can extract a statement highly relating to the slicing criteria (focused statement, for example, Assignment location.href in FIG. 16) by recursively tracing the data dependence relationship in the program dependence graph and then, tracing the control dependence relationship in the state of being narrowed down to the predetermined number of times or less (for example, once).

Figure 17:
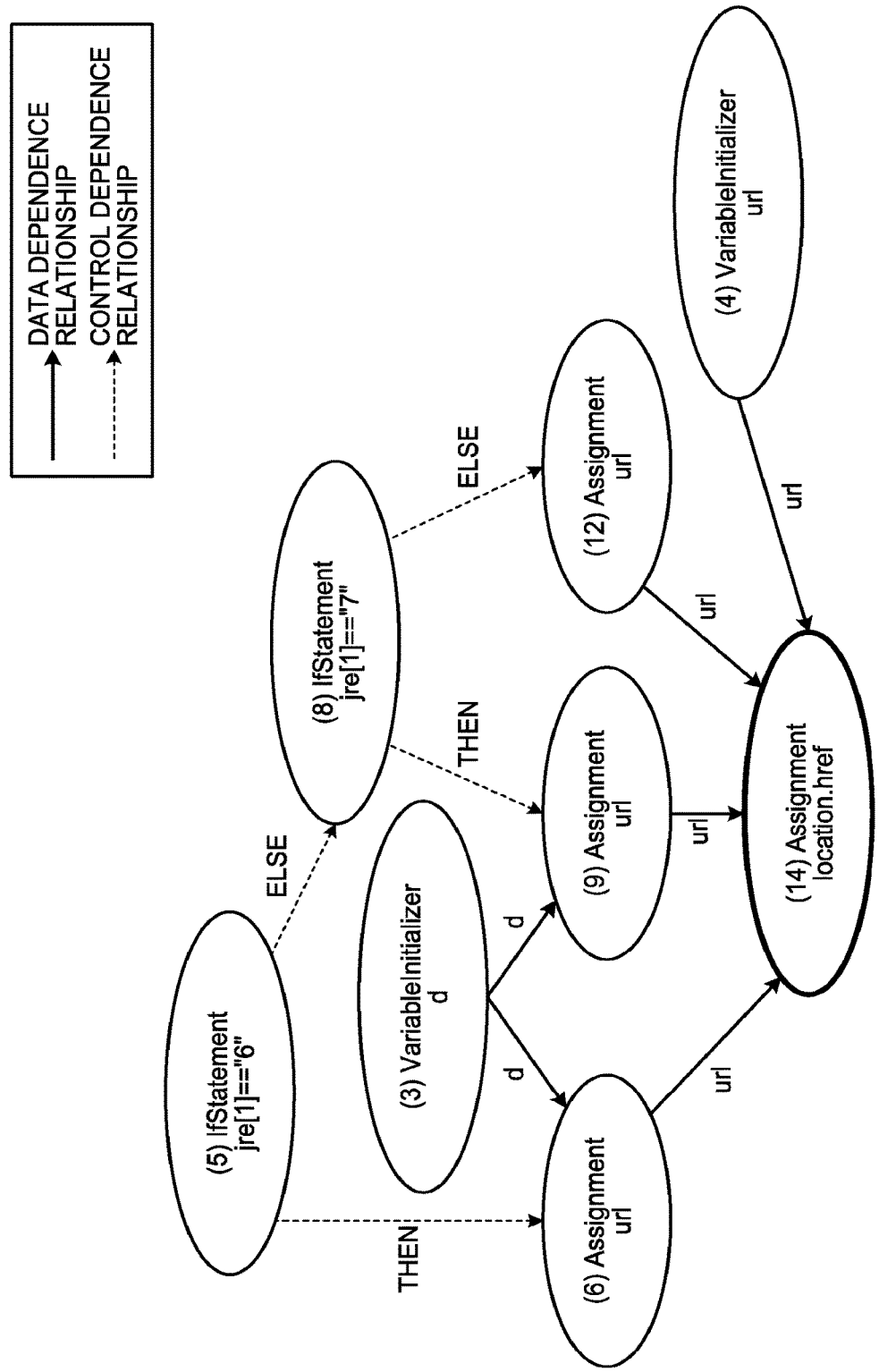
FIG. 17 is a diagram illustrating an example of a node which becomes an extraction target based on a slicing criteria <14,location.href>.

The program slicing unit 276a extracts a slice by setting the statement of the PDG node (Assignment location.href) emphasized by the bold line using the program dependence graph illustrated in FIG. 16, for example, as a slicing criteria (location.href:<14,location.href> in the fourteenth line of the code illustrated in FIG. 14). For example, the program slicing unit 276a first extracts the PDG node recursively considering the statement of location.href in the fourteenth line of the code illustrated in FIG. 14 and the data dependence relationship based on the slicing criteria <14, location.href>, and then, extracts the PDG node considering the control dependence relationship only once (that is, the PDG node illustrated in FIG. 17 is extracted from the program dependence graph illustrated in FIG. 16). Further, the program slicing unit 276a extracts a slice illustrated as reference sign 701a→reference sign 702a in FIG. 18 based on the PDG node illustrated in FIG. 17, for example.

The execution path search unit 270a in FIG. 13 extracts a slice for each execution path by performing syntax analysis of the slice using the syntax analysis unit 274a when a plurality of execution paths are included in the slice extracted by the program slicing unit 276a (that is, the conditional branch statement and the like are included at the time of considering the control dependence relationship). That is, the execution path search unit 270a extracts a slice that does not depend on the control flow by causing the syntax analysis unit 274a to perform the syntax analysis of the search target code (slice) and extracting each slice for each execution path when the plurality of execution paths due to the conditional branch statement and the like are specified during the syntax analysis. For example, the execution path search unit 270a extracts three slices represented by reference signs 802a to 804a in FIG. 19 from the code (slice) represented by reference sign 801a in FIG. 19 (or reference sign 702a in FIG. 18).

Incidentally, the execution path search unit 270a extracts the slice without depending on the control flow, and thus, generates each slice obtained by removing the conditional branch statement, the loop statement, the exception handling statement, or the like.

The slice execution unit 277a of FIG. 13 causes the slice extracted by the program slicing unit 276a or the execution path search unit 270a to be executed in the script interpreter 254a. That is, the slice execution unit 277a causes the script interpreter 254a to interpret the slice extracted by the program slicing unit 276a or the execution path search unit 270a, and monitors an argument of each value to be assigned to the object and the function and the property of the object used in the transfer code or the content acquisition code during the interpretation, and extracts a URL.

For example, the slice execution unit 277a causes the script interpreter 254a of the browser emulator 25a to execute the respective slices represented by reference signs 802a to 804a in FIG. 19, monitors the arguments of the object and the function and the assigned value of the property used in the transfer code, and extracts a URL of http://A.example/mal1/, http://A.example/mal2/, http://B.example/benign/ from the monitored property of location.href, for example.

However, the slice execution unit 277*a* executes a slice at a timing when read of a DOM (Document Object Model) is completed (for example, immediately before a DOMContentLoaded event in Firefox (registered trademark) or Google Chrome (registered trademark)) so as to enable execution of a code to operate the DOM. In addition, the slice execution unit 277*a* duplicates, for execution of a slice, DOM information (a structure or a value of a DOM tree) and context information (for example, the variable definition, the function definition, or the like) of JavaScript (registered trademark) at a point in time of executing the slice and discard the information after executing the slice such that a result of the slice execution does not affect processing of original JavaScript (registered trademark) or the like.

In addition, the access unit 252*a* of the browser emulator 25*a* further acquires web content by accessing a URL extracted by the slice execution (for example, a URL associated with "slice" of "1" in the analysis information illustrated in FIG. 22), and executes the script interpretation using the script interpreter 254*a* and each processing using the syntax analysis unit 274*a*, the program dependence graph construction unit 275*a*, the program slicing unit 276*a*, the execution path search unit 270*a*, and the slice execution unit 277*a* in the same manner as described above when a code is included in the acquired web content. That is, the browser emulator manager 23*a* performs recursive analysis with respect to the URL extracted by the slice execution. Accordingly, the browser emulator manager 23*a* can extract URLs which are likely to be the attack URL or the stepping-stone URL as many as possible.

Incidentally, whether to perform the recursive analysis with respect to the URL extracted by the slice execution as above using the browser emulator manager 23*a* may be appropriately set by an administrator of the system or the like depending on an object as a monitoring target, a property of the object, and a function.

According to the program analysis unit 273*a* described above, the code acquired from the web content is exhaustively analyzed, and the transfer code is specified. Further, the URL is extracted from the specified transfer code. In addition, the program analysis unit 273*a* specifies the client environment information required for the transfer to the extracted URL. The specifying of the client environment information performed by the program analysis unit 273*a* will be described.

(Specifying of Client Environment Information)

When the slice extracted by the program slicing unit 276*a* includes a conditional branch statement in the case where the URL has been extracted by the slice execution unit 277*a*, the program analysis unit 273*a* sets the conditional branch statement as a slicing criteria. Further, the program slicing unit 276*a* extracts a slice using the slicing criteria and executes the extracted slice using the slice execution unit 277*a*. As a result, when the determination of a condition to use the client environment information has been performed with a conditional branch statement in the previous stage of a transfer code from which the URL has been extracted in the code included in the web content, it is possible to know that the transfer code is the transfer code that depends on the client environment.

The condition determination is performed after performing split and coupling of version information using a character string operation function in order to evaluate a major version and a minor version of the browser and the plug-in in many cases in the conditional branch statement using the client environment information as above (see the statement in the second line in the code illustrated in FIG. 14 and Non Patent Literature 5). Therefore, the slice execution unit 277*a* causes the script interpreter 254*a* to interpret the slice extracted by the program slicing unit 276*a* and monitors the arguments of the object and the function and the assigned value of the property, which relate to the character string operation or the like used for the slice during the interpretation, thereby specifying the use of the client environment information through the slice execution. That is, the slice execution unit 277*a* associates an extracted URL with the client environment information required for the transfer to the URL.

Figure 18:
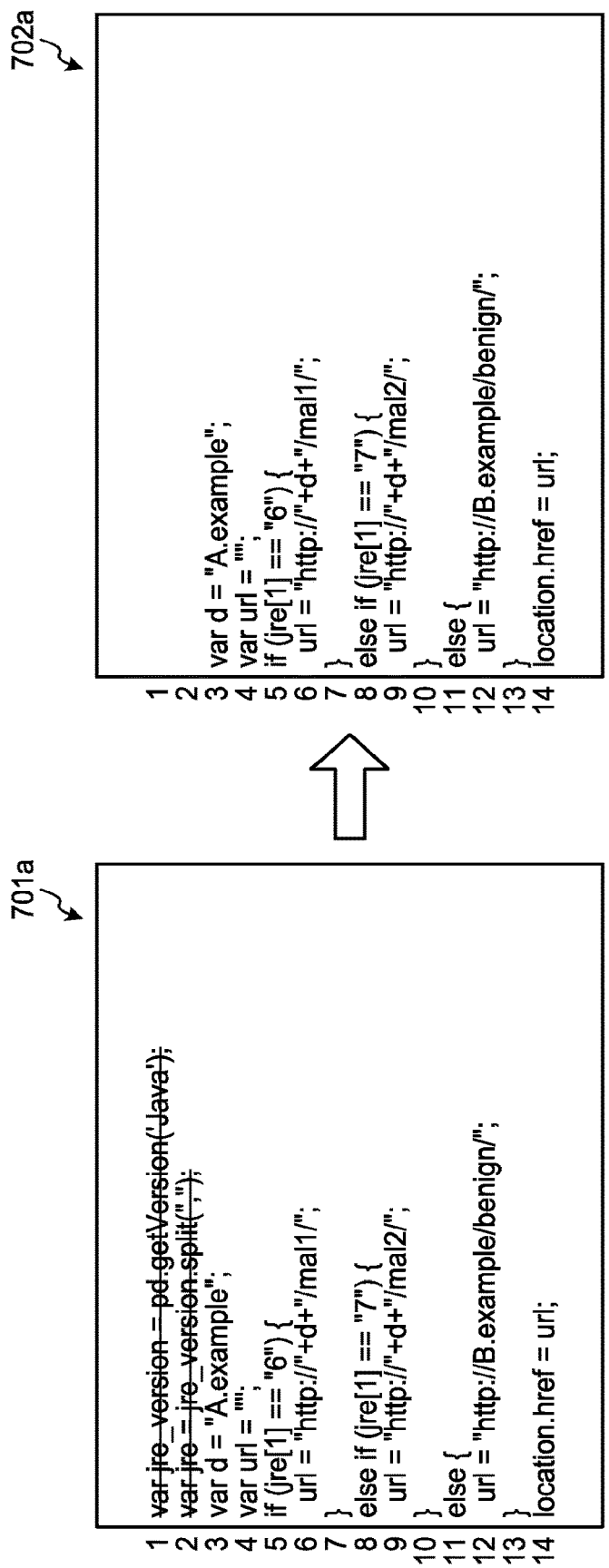
FIG. 18 is a diagram for describing a slice to be extracted based on the slicing criteria <14,location.href>.
Figure 20:
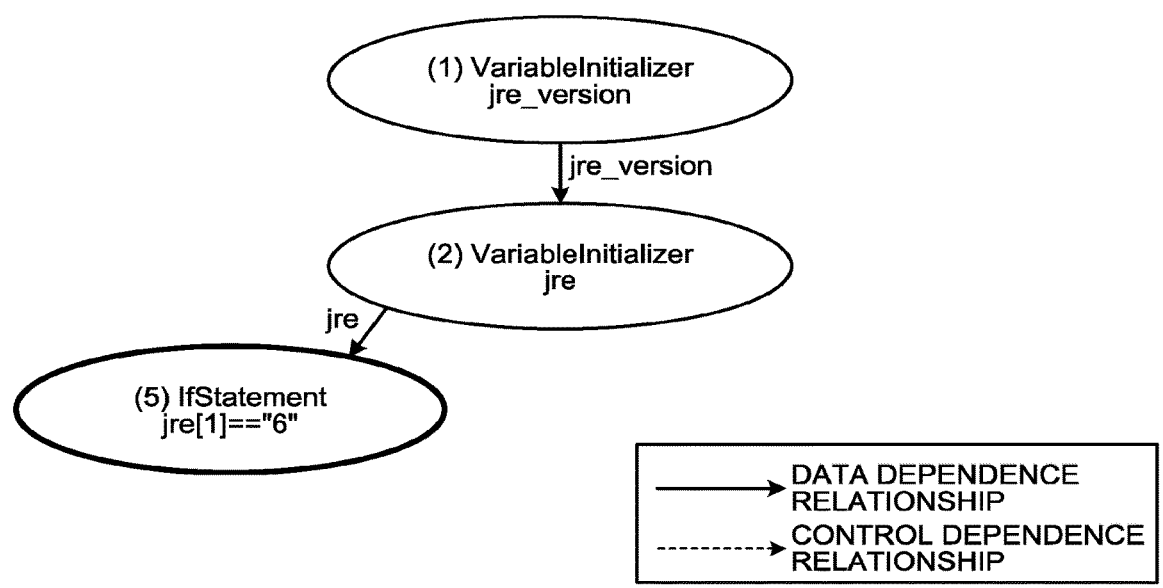
FIG. 20 is a diagram illustrating an example of a node which becomes an extraction target based on a slicing criteria <5,if>.

For example, when the conditional branch statement included in the slice represented by reference sign 702*a* in FIG. 18 (or reference sign 801*a* in FIG. 19) is set as the slicing criteria (corresponding to if statement: <5,if> in the fifth line of the code represented by reference sign 702*a* in FIG. 18), a PDG node as an extraction target is illustrated in FIG. 20. Incidentally, the program slicing unit 276*a* also extracts a slice based on a slicing criteria <8,if> in the same manner although not described.

Figure 21:
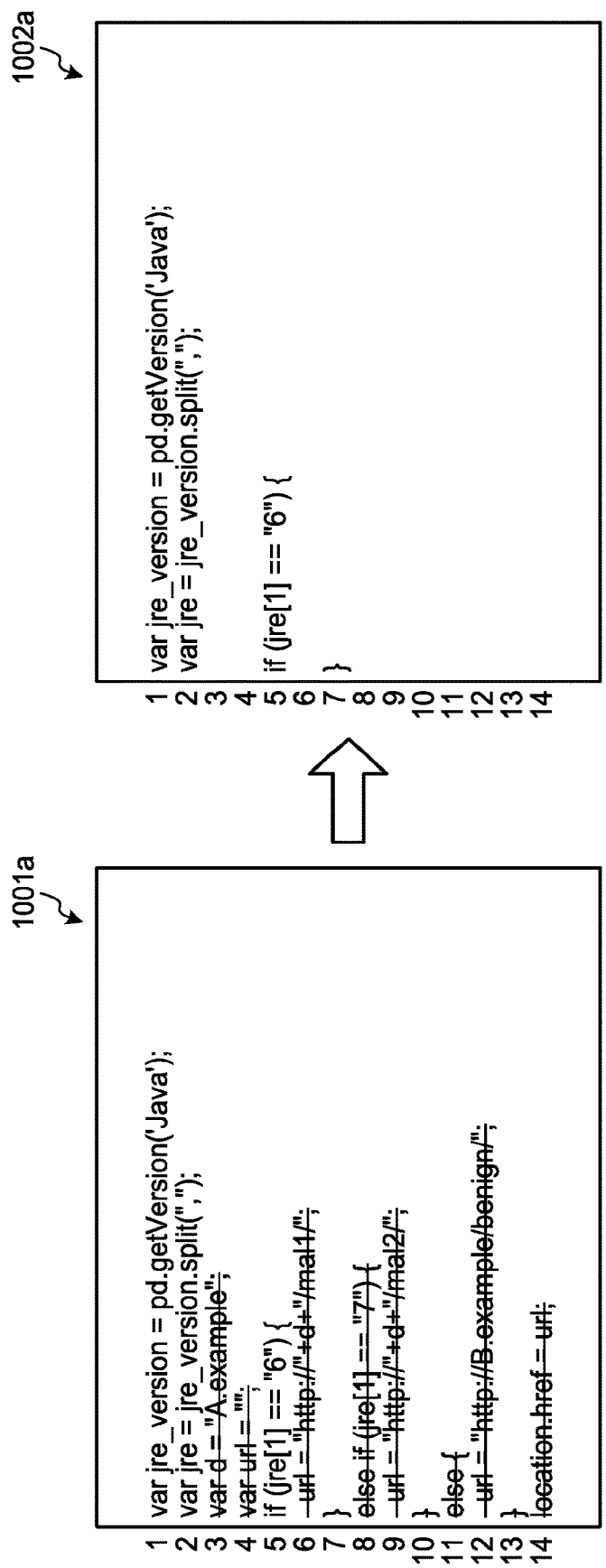
FIG. 21 is a diagram for describing a slice to be extracted based on the slicing criteria <5,if>.

Further, the program slicing unit 276*a* extracts a slice illustrated as reference sign 1001*a*→reference sign 1002*a* in FIG. 21 based on the PDG node illustrated in FIG. 20, for example.

For example, it is considered a case in which the browser emulator 25*a* emulates client environment where a Java (registered trademark) version "1.6.0.22" is installed. In this case, the slice execution unit 277*a* causes the script interpreter 254*a* of the browser emulator 25*a* to execute the slice represented by reference sign 1002*a* in FIG. 21 and monitors the arguments of the object and the function and the assigned value of the property relating to the character string operation or the like. Further, when a String object of a split function which is a function relating to the character string operation which is monitored in the slice execution unit 277*a* is specified as "1.6.0.22" which is the version value of Java (registered trademark), it is possible to specify that the environment information of Java (registered trademark) is used for the execution of the extracted slice.

Incidentally, when the slice execution unit 277*a* specifies the use of the client environment information in the code included in the web content, for example, the specifying may be performed using complete matching between name information and version information of client environment emulated by the browser emulator 25*a* or a signature of client information which uses regular expression may be generated and the specifying is performed using the signature.

However, the slice execution unit 277*a* duplicates the DOM information and the JavaScript (registered trademark) context information at a point in time of executing the slice similarly as the time of extracting the URL, for slice execution, and discards the information after the slice execution. Incidentally, the function or the property monitored at the time of slice execution is not limited the above, but the system administrator or the like may appropriately add or remove a function or a property as a monitoring target.

In addition, the method of specifying the client environment information that relates to the extracted URL also includes a method of using file extension information used in a URL and a method of using HTML tag information used in a tag transfer code. For example, when a URL is a URL which uses file extension of "jar", the method of using the file extension information can specify that the URL is a URL relating to Java (registered trademark). In addition, when a tag transfer code is a code which uses an object tag, for example, a URL is designated as a data attribute and a MIME type is designated as a type attribute according to the method of using the HTML tag information. Thus, when the type attribute is "application/pdf", for example, it is possible to specify that the URL designated as the data attribute is a URL relating to a PDF.

In this manner, the method of specifying the client environment information that relates to the URL using the file extension information or the HTML tag information may be also used together with the above-described specifying method of using the program analysis unit 273a, of course. In this manner, the program analysis unit 273a can increase the number of URLs with which the client environment information can be specified.

(Analysis Information Database)

Next the analysis information database 24a will be described. As described above, the analysis information database 24a stores the analysis information. An example of the analysis information is illustrated in FIG. 22 and is information which is associated with "analysis ID" as identification information of the analysis information, "access URL" as a URL accessed when the browser emulator 25a accesses the URL of an analysis target website, "time stamp" representing date and time when the URL is accessed, "slice" indicating whether the URL is a URL extracted by the program slicing, "environment information" indicating the client environment information required for transfer when the URL is a URL to which the transfer is performed depending on client environment, and the like.

Incidentally, the URL associated with the item of "slice" as "1" in the analysis information represents that the URL is the URL extracted by the program slicing, and a URL associated with the item of "slice" as "0" represents that the URL is not the URL extracted by the program slicing (that is, the URL is a URL extracted through normal access). In addition, "access URL" includes not only the URL of the analysis target website but also a URL of a website transferred by the access to the URL. Incidentally, the analysis information may include information other than above-described information, of course.

According to the above-described system, it is possible to exhaustively extract the URLs from the code acquired from the web content. As a result, the system can extract the URL which is likely to be the attack URL or the stepping-stone URL in the drive-by download attack performed depending on the client environment. In addition, the system can specify the client environment information required for the transfer to the extracted URL.

(Processing Procedure)

Figure 23:
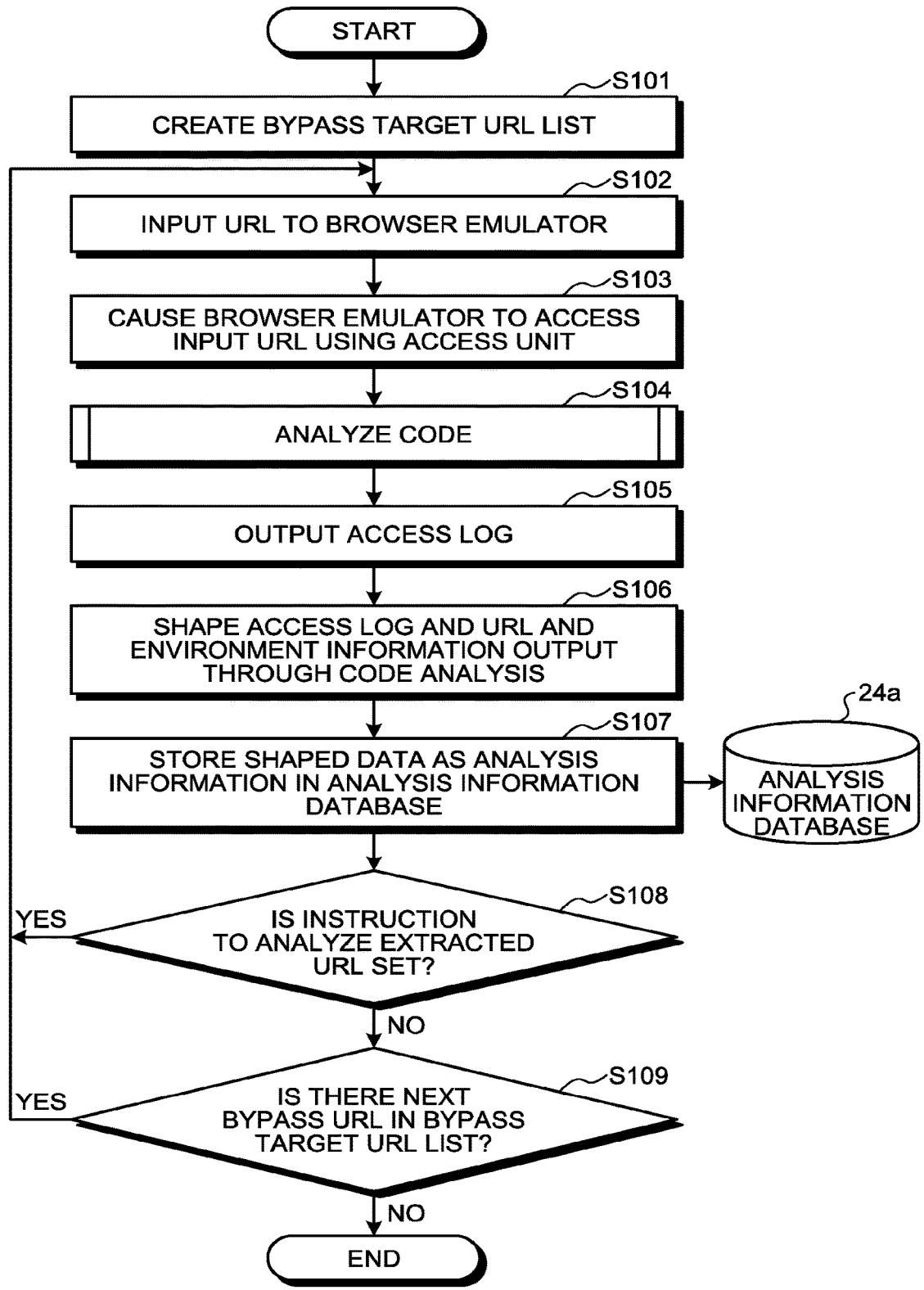
FIG. 23 is a flowchart illustrating an example of a processing procedure of a system.

Next, an example of a processing procedure of the system will be described with reference to FIG. 23. First, the URL list creation unit 271a creates the bypass target URL list (S101). For example, the URL list creation unit 271a creates the bypass target URL list based on the blacklist of published malicious websites.

Further, the access instruction unit 272a inputs a URL in the bypass target URL list to the browser emulator 25a (S102), and the browser emulator 25a accesses the URL input in S102 using the access unit 252a (S103). Further, the access unit 252a acquires web content from the URL as the access destination.

Incidentally, the access instruction unit 272a may cause the single browser emulator 25a to access a plurality of URLs or cause the plurality of browser emulators 25a to access URLs different from each other in S102.

After S103, the HTML/CSS parser 253a of the browser emulator 25a interprets the acquired web content, the script interpreter 254a interprets a code when the code is included in the acquired web content, and the program analysis unit 273a analyzes the code (S104). Details of the code analysis will be described later.

After S104, the access unit 252a outputs the access log (S105). That is, the access unit 252a outputs a result of the access to the URL input by the access instruction unit 272a as the access log. Further, the registration processing unit 278a shapes the access log output in S105 and the URL and the environment information output through the code analysis in S104 (S106) and stores the shaped data in the analysis information database 24a (see FIG. 22) (S107).

Here, if an instruction to analyze the URL extracted by the slice execution of the slice execution unit 277a is set (Yes in S108), the access instruction unit 272a reads the URL extracted by the slice execution from the analysis information of the analysis information database 24a and performs the processes of S102 and the subsequent steps using the URL as a URL which is a bypass target URL. That is, the browser emulator manager 23a performs recursive analysis with respect to the URL extracted by the slice execution.

Incidentally, if the instruction to analyze the URL extracted by the slice execution is not set in S108 (No in S108) and there is the next bypass URL in the bypass target URL list (Yes in S109), the process returns to S102. On the other hand, if there is no next bypass URL in the bypass target URL list (No in S109), the process is ended.

When the analysis information is stored in the analysis information database 24a in the above-described manner, the URL analysis unit 279a performs an analyzing process of URLs in the analysis information to extract a URL which is highly likely to be the attack URL or the stepping-stone URL, for example.

Figure 24:
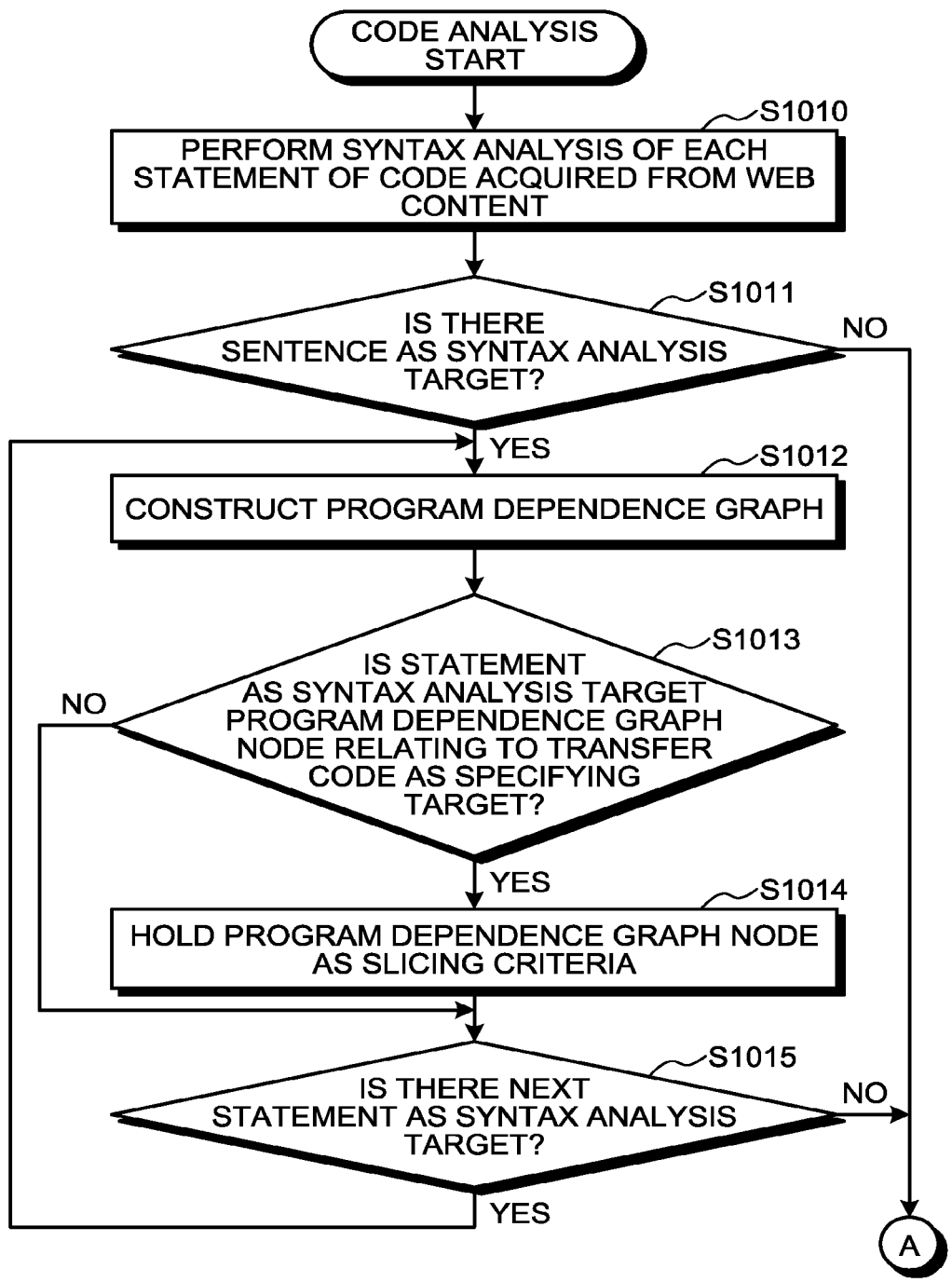
FIG. 24 is a flowchart illustrating an example of a processing procedure of code analysis of FIG. 23.

Next, the code analyzing process in S104 of FIG. 23 will be described in detail with reference to FIG. 24, FIG. 25, and FIG. 26.

First, the syntax analysis unit 274a performs syntax analysis of each statement of the code acquired from the web content (S1010). Here, if there is a statement as a target of the syntax analysis (Yes in S1011), the program dependence graph construction unit 275a constructs the program dependence graph (see FIG. 16) (51012). On the other hand, there is no statement as the syntax analysis target (No in S1011), the process proceeds to S1016 in FIG. 25.

In addition, when the statement as the syntax analysis target is the program dependence graph node (PDG node) relating to the transfer code as the specifying target after 51012 (Yes in S1013), the program dependence graph construction unit 275a holds the PDG node as the slicing criteria (S1014). On the other hand, when the statement as the syntax analysis target is the PDG node which does not relate to the transfer code as the specifying target in S1013 (No in S1013), the process proceeds to S1015.

In S1015, when the syntax analysis unit 274a determines that there is the next statement as the syntax analysis target (Yes in S1015), the process returns to S1012. On the other hand, when it is determined that there is no next statement as the syntax analysis target (No in S1015), the process proceeds to S1016 in FIG. 25.

Figure 25:
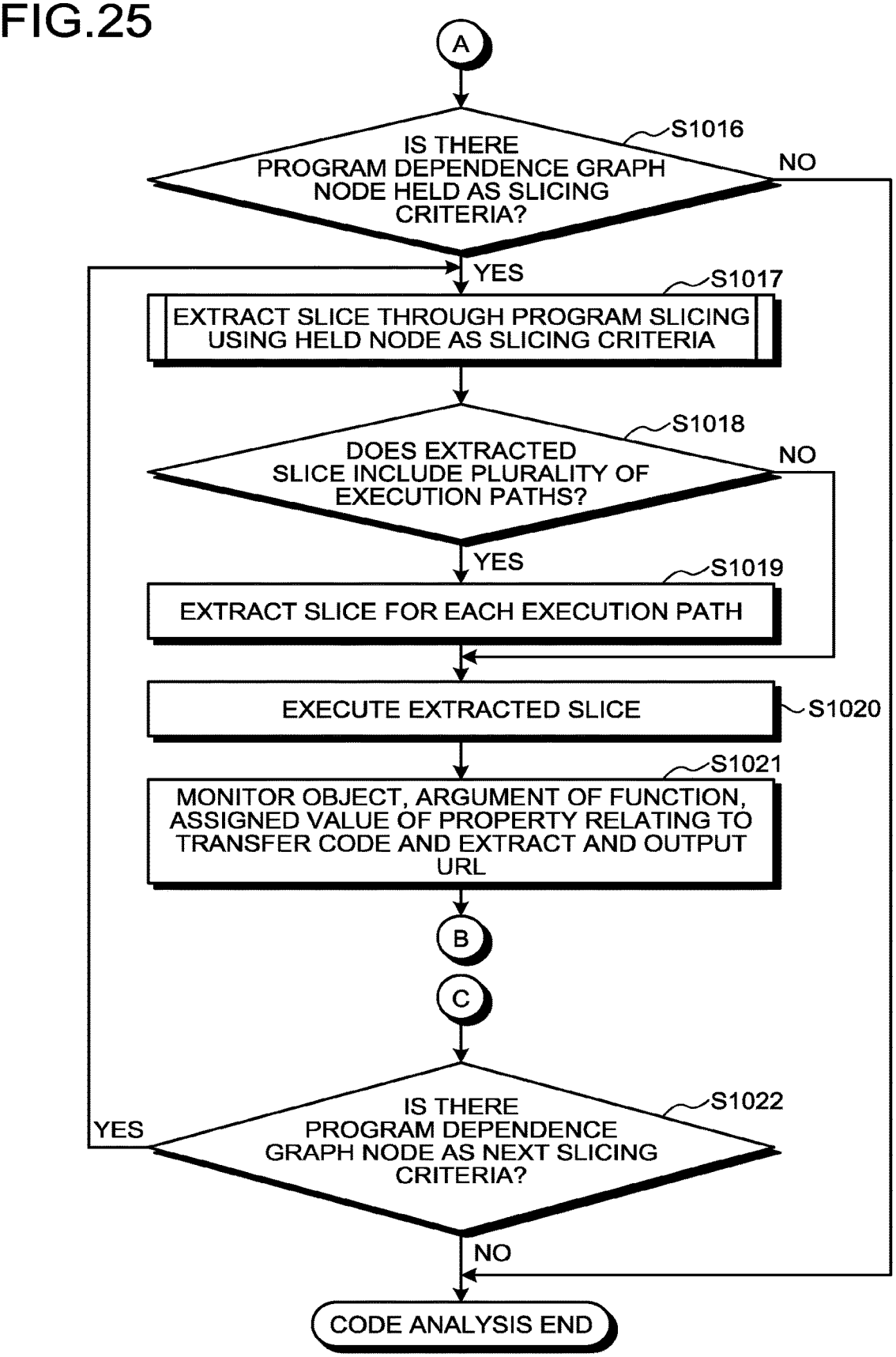
FIG. 25 is a flowchart illustrating an example of the processing procedure of the code analysis of FIG. 23.

In S1016 of FIG. 25, when the program analysis unit 273a determines that there is the PDG node held as the slicing criteria in S1014 (Yes in S1016), the program slicing unit 276a extracts a slice by program slicing using the held node (PDG node) as the slicing criteria (S1017). Details of this slice extracting process using the program slicing unit 276a will be described later. Incidentally, the program analysis unit 273a determines that there is no PDG node held in S1014 as the slicing criteria in S1016 (No in S1016), the process is ended.

After S1017, when the execution path search unit 270a determines that the slice extracted in S1017 includes a plurality of execution paths (Yes in S1018), a slice is extracted for each execution path (S1019). On the other hand, when the execution path search unit 270a determines that the slice extracted in S1017 does not include a plurality of execution paths (No in S1018), the process proceeds to S1020.

In S1020, the slice execution unit 277a executes the slice extracted in S1017 when the slice extracted in S1017 does not include a plurality of execution paths, and executes the slice extracted in S1019 when the slice extracted in S1017 includes a plurality of execution paths (S1020). At this time, the slice execution unit 277a monitors the arguments of the object and the function and the assigned value of the property relating to the transfer code and extract and output the URL used in the transfer code (S1021). After S1021, the process proceeds to S1023 in FIG. 26.

Figure 26:
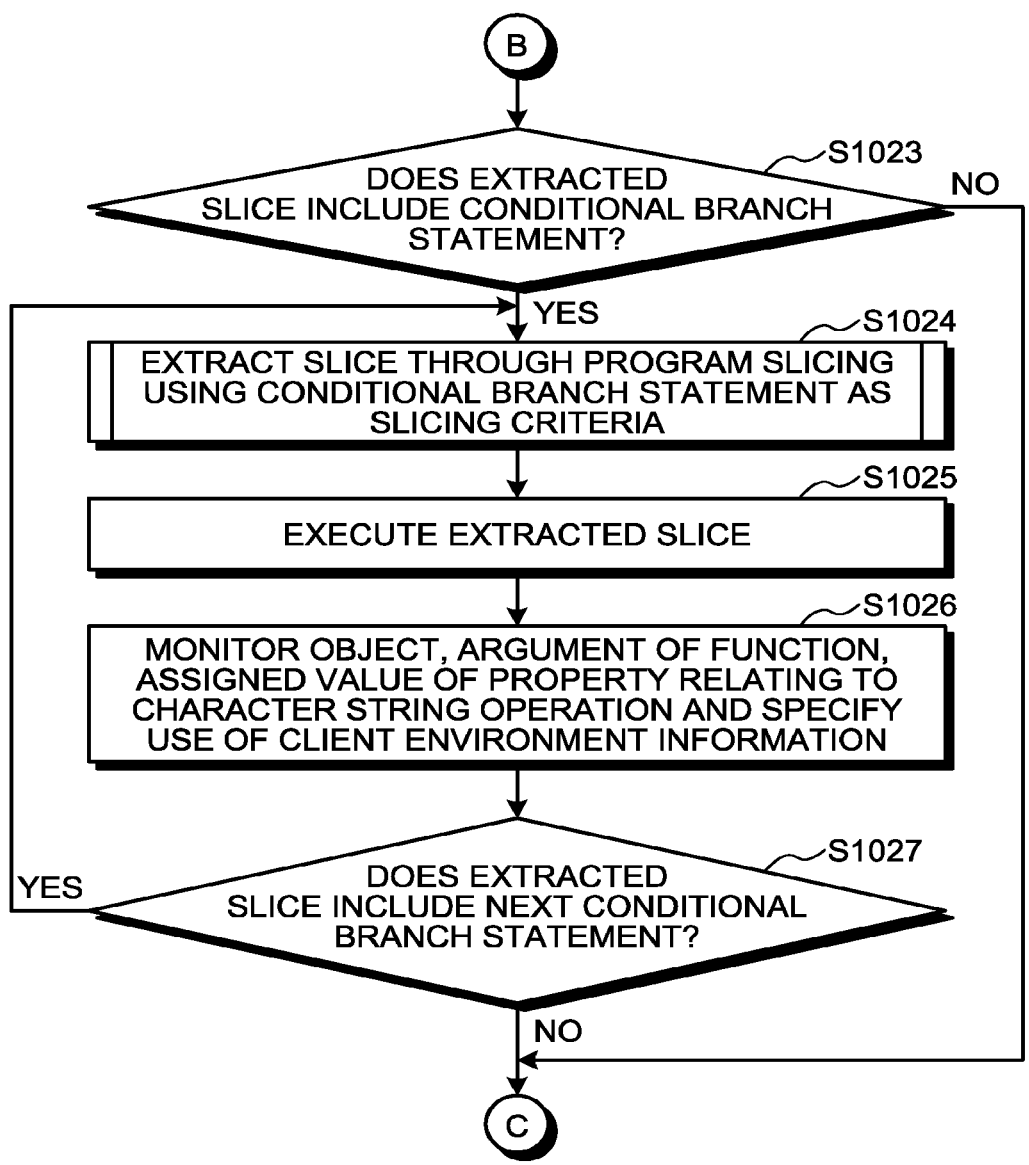
FIG. 26 is a flowchart illustrating an example of the processing procedure of the code analysis of FIG. 23.

In S1023 of FIG. 26, when the slice extracted in S1017 of FIG. 25 includes a conditional branch statement (Yes in S1023), the program slicing unit 276a extracts a slice through program slicing using the conditional branch statement as a slicing criteria (S1024). Details of this slice extracting process using the program slicing unit 276a will be described later similarly to S1017. Incidentally, the slice extracted in S1017 of FIG. 25 does not include the conditional branch statement in S1023 (No in S1023), the process proceeds to S1022 in FIG. 25.

After S1024, the slice execution unit 277a executes the slice extracted in S1024 (S1025). At this time, the slice execution unit 277a specifies the use of the client environment information by the execution of the slice extracted in S1024 by monitoring the arguments of the object and the function and the assigned value of the property relating to the character string operation (S1026).

After S1026, the process returns to S1024 when the extracted slice includes the next conditional branch statement (Yes in S1027) or proceeds to S1022 in FIG. 25 when the extracted slice does not include the next conditional branch statement (No in S1027).

In S1022 of FIG. 25, the process returns to S1017 when there is a PDG node as the next slicing criteria (Yes in S1022) or is ended when there is no PDG node as the next slicing criteria (No in S1022).

Figure 27:
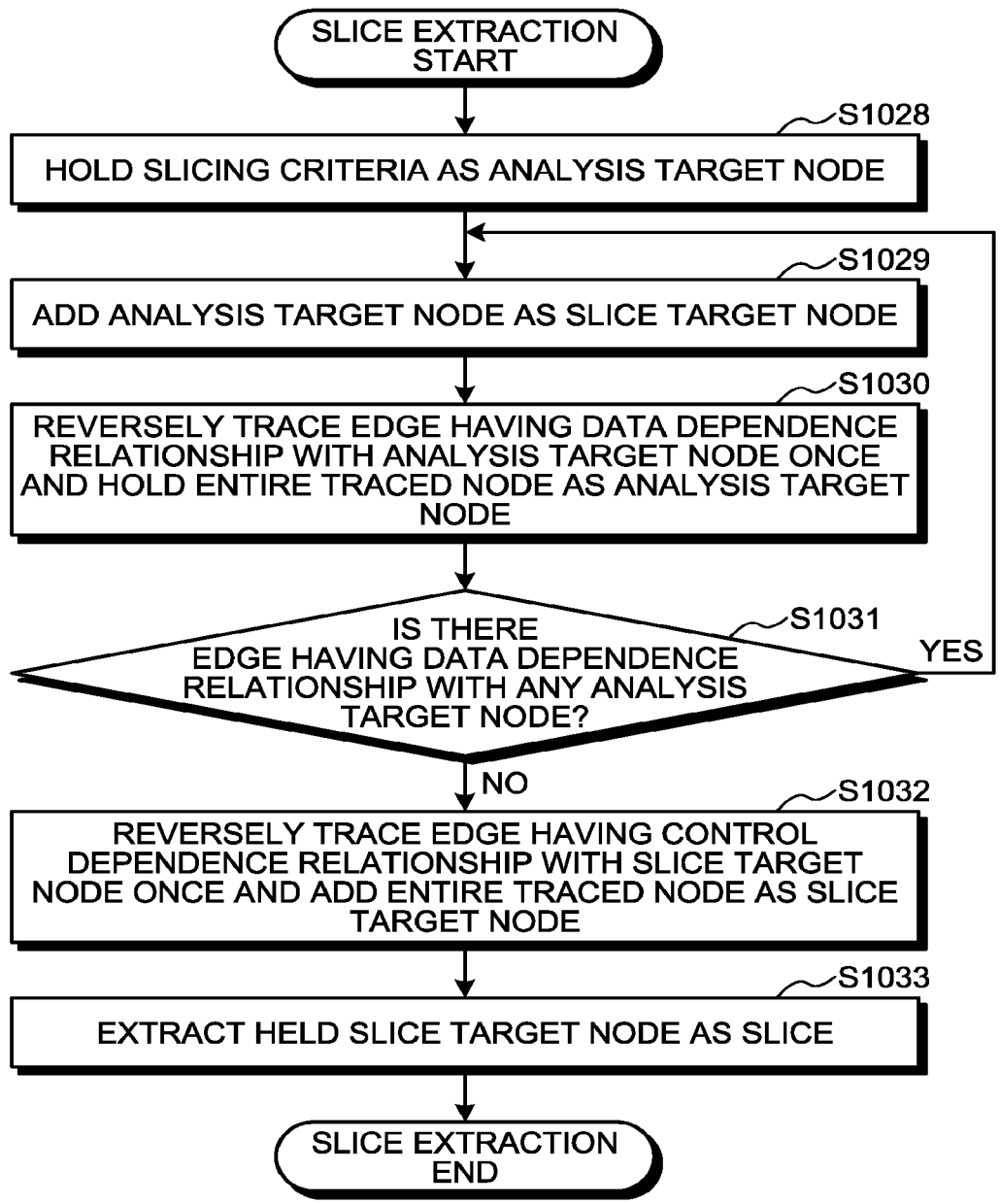
FIG. 27 is a flowchart illustrating an example of a processing procedure of extraction of a slice in FIG. 25 and FIG. 26.

Next, the process (slice extracting process) in S1017 of FIG. 25 and S1024 of FIG. 26 will be described with reference to FIG. 27.

First, the program slicing unit 276a holds the node (PDG node), which is the slicing criteria, as an analysis target node (S1028), and adds the held analysis target node as a slice target node (S1029). Next, the program slicing unit 276a reversely traces the PDG edge having the data dependence relationship with the held analysis target node, once, and holds all the traced PDG nodes as the analysis target nodes (S1030). The process returns to S1029 when there is an edge (PDG edge) having the data dependence relationship with any of the held analysis target nodes (Yes in S1031) or proceeds to S1032 when there is no PDG edge having the data dependence relationship with any of the held analysis target nodes (No in S1031).

In S1032, the program slicing unit 276a reversely traces the PDG edge having the control dependence relationship with the slice target node (that is, the PDG node extracted by tracing the PDG edge having the data dependence relationship in the program dependence graph), once, and adds all the traced PDG nodes as slice target nodes (S1032). After S1032, the program slicing unit 276a extracts the PDG node, which is the held slice target node, as the slice (S1033), thereby ending the process.

The above-described process will be exemplified. For example, when a PDG node ((14) Assignment location.href) of the slicing criteria is set as the analysis target node in the program dependence graph illustrated in FIG. 16, the program slicing unit 276a reversely traces the PDG edges having the data dependence relationship with the PDG node (Assignment location.href), once, and holds all the traced PDG nodes ((6) Assignment url, (9) Assignment url, (12) Assignment url and (4) VariableInitializer url) as new analysis target nodes. In addition, each of the PDG nodes of (6) Assignment url and (9) Assignment url in FIG. 16 further has the PDG edge in the data dependence relationship, the program slicing unit 276a reversely traces the PDG edge and also holds a PDG node of (3) VariableInitializer d as a new analysis target node. Among the analysis target nodes held at this time, (6) Assignment url, (9) Assignment url and (12) Assignment url include the PDG edges in the control dependence relationship, and thus, the program slicing unit 276a reversely traces the PDG edges once, and adds all the traced PDG nodes, that is, the PDG nodes of (5) IfStatement jre[1]=="6" and (8) IfStatement jre[1]=="7" as slice target nodes. Further, the program slicing unit 276a extracts the held PDG nodes, that is, (14) Assignment location.href, (6) Assignment url, (9) Assignment url, (12) Assignment url, (4) VariableInitializer url, (3) VariableInitializer d, (5) IfStatement jre[1]=="6" and (8) IfStatement jre[1]=="7" as the slices. For example, the program slicing unit 276a extracts the slice illustrated as reference sign 701a→reference sign 702a in FIG. 18 based on the PDG node illustrated in FIG. 17.

In addition, for example, when the PDG node ((5) IfStatement jre[1]=="6") of the slicing criteria is set as the analysis target node in the program dependence graph illustrated in FIG. 16, the program slicing unit 276a reversely traces the PDG edges having the data dependence relationship with the PDG node ((5) IfStatement jre[1]=="6"), once, and holds the entire traced PDG node ((2) VariableInitializer jre) as a new analysis target node. In addition, the PDG node of (2) VariableInitializer jre further has the PDG edge in the data dependence relationship, the program slicing unit 276a reversely traces the PDG edge and also holds a PDG node of (1) VariableInitializer jre_version as a new analysis target node. Incidentally, there is no PDG edge having the control dependence relationship with the PDG node of (1) VariableInitializer jre_version in this case, and thus, the program slicing unit 276a extracts (5) IfStatement jre[1]=="6", (2) VariableInitializer jre, and (1) VariableInitializer jre_version as the slices. For example, the program slicing unit 276a extracts the slice illustrated as reference sign 1001a→reference sign 1002a in FIG. 21 based on the PDG node illustrated in FIG. 20.

According to the above-described system, it is possible to analyze the code that performs the drive-by download attack depending on the client environment, in detail. As a result, for example, it is possible to exhaustively extract the URL which is likely to be the attack URL or the stepping-stone URL in the drive-by download attack from the code without depending on the client environment. In addition, the system can specify the client environment required for the transfer to the extracted URL which is likely to be the attack URL or the stepping-stone URL. As a result, when an environment-dependent attack is analyzed using the conventional honey pot technology, it is possible to effectively determine any client environment to be set in order to reach the attack URL or the stepping-stone URL. In addition, it is possible to optimize a URL blacklist that needs to be introduced according to client environment of each client by integrating URLs for each client environment.

[Other Embodiments]

Incidentally, the object and the function and the property of the object specified by the syntax analysis unit 274a are not limited to those relating to the transfer code or the content acquisition code, but may be appropriately changed depending on a purpose.

In addition, the statement set as the program dependence graph node in the program dependence graph among the statements of the JavaScript (registered trademark) code in the program dependence graph construction unit 275a is assumed as the variable definition statement, the assignment statement, the function definition statement, the function execution statement, the return statement, the conditional branch statement, the loop statement, the exception handling statement, or the like, but any addition or change may be made by the administrator of the system or the like other than the above-described statements.

Incidentally, the information output as the result of the code analysis by the program analysis unit 273a may be information other than the URL. For example, when the information on an object and a function and a property of the object used in an attack code is known in advance, the program analysis unit 273a may specify the attack code using the information and output the various types of information used in the specified attack code.

In addition, the system is assumed to access the analysis target website 12a using the browser emulator 25a, but may access the analysis target website 12a using a configuration other than the browser emulator 25a (for example, the actual client environment).

Further, the program slicing unit 276a is assumed to extract the slice using the program dependence graph, but may not use the program dependence graph as long as it is possible to grasp the control dependence relationship and the data dependence relationship of each code.

Incidentally, the use of the client environment information is assumed to be specified using the program analysis unit 273a after the extraction of the URL using the program analysis unit 273a, but may be changed not to be specified appropriately by the system administrator.

In addition, the browser emulator 25a is assumed to use the HTML/CSS parser 253a as the content parser, but a content parser that interprets web content such as a PDF file used in Adobe Acrobat (registered trademark) and a SWF file used in Adobe Flash Player (registered trademark). Incidentally, when the PDF file is interpreted, JavaScript (registered trademark) is used as an analysis target code, and the script interpreter 254a is configured to use a JavaScript (registered trademark) interpreter. In addition, when the SWF file is interpreted, ActionScript is used as an analysis target code, and the script interpreter 254a is configured to use an ActionScript interpreter.

In addition, the program analysis unit 273a may use a code other than JavaScript (registered trademark), for example, VBScript as the analysis target code, and in such a case, the script interpreter 254a is configured to use a VBScript interpreter.

In addition, the program analysis unit 273a is configured to perform the slice extraction using a conditional branch statement as the slicing criteria when the URL has been extracted by the slice execution unit 277a and the slice extracted by the program slicing unit 276a includes the conditional branch statement, but the invention is not limited thereto. For example, the program analysis unit 273a may perform the slice extraction using a conditional branch statement as the slicing criteria regardless of whether the URL has been extracted by the slice execution unit 277a as long as the slice extracted by the program slicing unit 276a includes the conditional branch statement.

(Program)

In addition, it is possible to create and execute a program obtained by writing the process executed by the browser emulator managers 23 and 23a according to the above-described embodiments in a language that can be executed by a computer. In this case, it is possible to obtain the same effects as those of the above-described embodiments by causing the computer to execute the program. Further, the same processes as those of the above-described embodiments may be realized by recording the above-described program in a computer-readable recording medium and causes a computer to read the program recorded in the recording medium. Hereinafter, a description will be given regarding an example of the computer to execute a control program that realizes the same function as the browser emulator manager 23.

Figure 28:
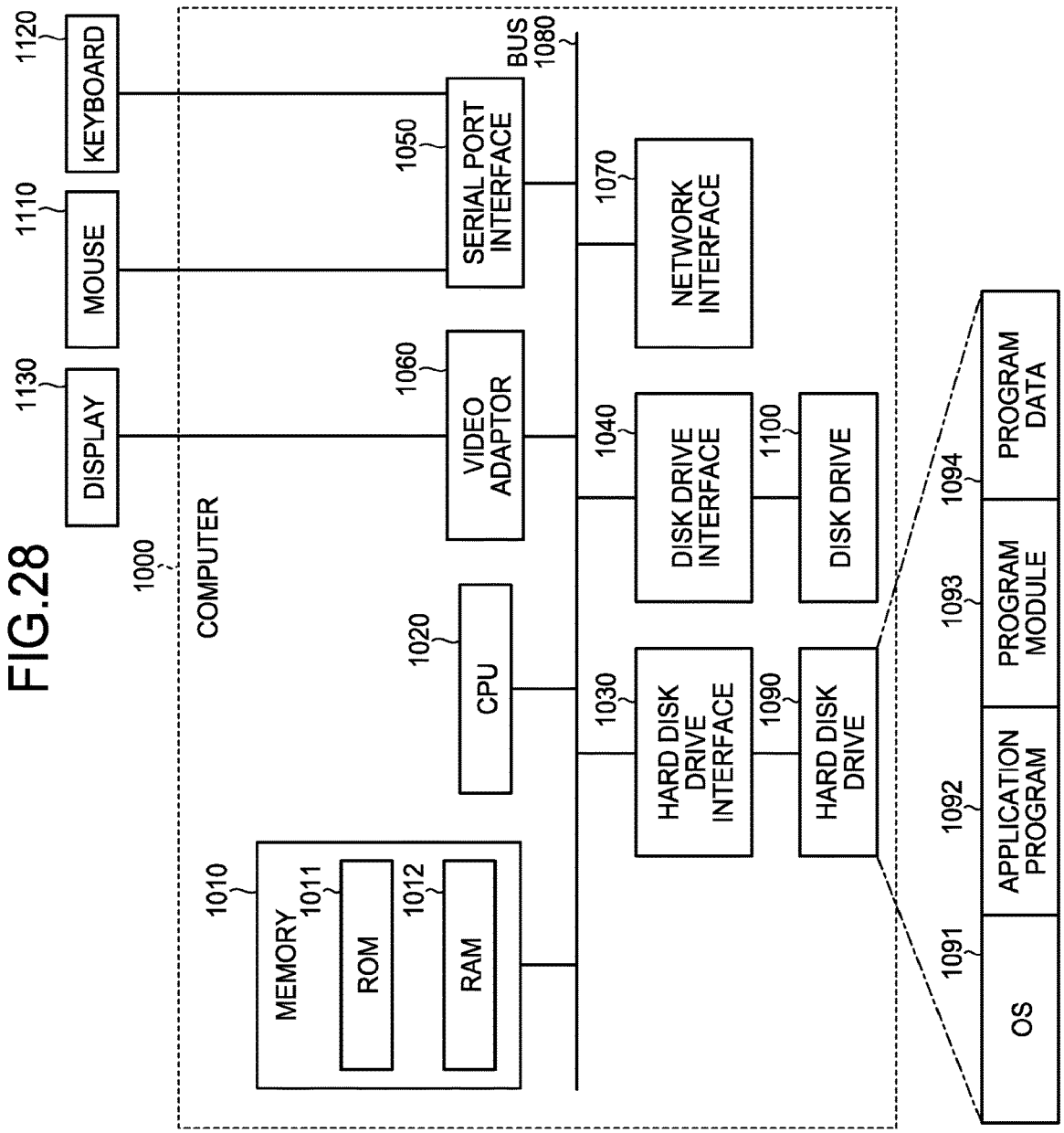
FIG. 28 is a diagram illustrating a computer to execute an analysis program.

FIG. 28 is a diagram illustrating a computer to execute an analysis program. As illustrated in FIG. 28, a computer 1000 includes, for example, a memory 1010, a CPU (Central Processing Unit) 1020, a hard disk drive interface 1030, a disk drive interface 1040, a serial port interface 1050, a video adapter 1060, and a network interface 1070. The respective parts are connected to each other via a bus 1080.

The memory 1010 includes a ROM (Read Only Memory) 1011 and a RAM (Random Access Memory) 1012. The ROM 1011 stores a boot program such as a BIOS (Basic Input Output System), for example. The hard disk drive interface 1030 is connected to a hard disk drive 1090. The disk drive interface 1040 is connected to a disk drive 1100. A detachable storage medium, for example, a magnetic disk, an optical disk, or the like is inserted into the disk drive 1100. For example, a mouse 1110 and a keyboard 1120 are connected to the serial port interface 1050. For example, a display 1130 is connected to the video adapter 1060.

Here, the hard disk drive 1090 stores, for example, an OS 1091, an application program 1092, a program module 1093, and program data 1094 as illustrated in FIG. 28. The search target code information, the access log, the URL extracted by the analysis, and the like, which have been described in the above-described embodiments, are stored in, for example, the hard disk drive 1090 or the memory 1010.

In addition, the analysis program is stored in the hard disk drive 1090 as the program module in which a command to be executed by the computer 1000 is written, for example. To be specific, the program module in which each process executed by the browser emulator manager 23 described in the above-described embodiments is written is stored in the hard disk drive 1090.

In addition, the data used for information processing according to the analysis program is stored as the program data in the hard disk drive 1090, for example. Further, the CPU 1020 causes the RAM 1012 to read the program module 1093 and the program data 1094 stored in the hard disk drive 1090 if necessary, and executes each procedure described above.

Incidentally, the program module 1093 and the program data 1094 according to the analysis program may be stored in a detachable storage medium, for example, and be read by the CPU 1020 using the disk drive 1100 or the like without being limited to the case of being stored in the hard disk drive 1090. Alternatively, the program module 1093 and the program data 1094 according to the control program may be stored in another computer connected via a network such as a LAN (Local Area Network) or a WAN (Wide Area Network) and read by the CPU 1020 using the network interface 1070.

REFERENCE SIGNS LIST 1, 1a, 2, 2a NETWORK
3, 3a PACKET TRANSFER DEVICE
12, 12a ANALYSIS TARGET WEBSITE
23, 23a BROWSER EMULATOR MANAGER
24, 24a ANALYSIS INFORMATION DATABASE
25, 25a BROWSER EMULATOR
26, 26a HOST SYSTEM
27, 27a CONTROL UNIT
251, 251a CLIENT ENVIRONMENT EMULATION UNIT
252, 252a ACCESS UNIT
253, 253a HTML/CSS PARSER
254, 254a SCRIPT INTERPRETER
270a EXECUTION PATH SEARCH UNIT
271, 271a URL LIST CREATION UNIT
272, 272a ACCESS INSTRUCTION UNIT
273, 273a PROGRAM ANALYSIS UNIT
274, 274a SYNTAX ANALYSIS UNIT
275, 275a PROGRAM DEPENDENCE GRAPH CONSTRUCTION UNIT
276, 276a PROGRAM SLICING UNIT
277, 277a SLICE EXECUTION UNIT
278, 278a REGISTRATION PROCESSING UNIT
279, 279a URL ANALYSIS UNIT

The invention claimed is:

1. An analysis device that analyzes a code included in web content, the device comprising:
processing circuitry configured to
access, via the Internet, a site that provides the web content;
search a transfer code to another site from the code by performing syntax analysis of the code included in the web content and specify at least any of an object and a function and a property of the object which are used in the transfer code found as a result of the search;
extract a code having a dependence relationship with the transfer code based on at least any of the object and the function and the property of the object thus specified and store a uniform resource locator (URL) of the another site in a memory; and
analyze the URL of the another site stored in the memory to determine if the another site is a malicious site,
wherein the processing circuitry is further configured to construct a program dependence graph, which represents a data dependence relationship and a control dependence relationship between nodes, using each statement of the code included in the web content as the node when the transfer code is found as a result of the search by the processing circuitry, and specify a node corresponding to the found transfer code using the program dependence graph, and
reversely slice the code based on the data dependence relationship in the program dependence graph using the specified node as a slicing criteria to extract a code having the dependence relationship with the transfer code.

2. The analysis device according to claim 1, wherein the processing circuitry is further configured to cause a script interpreter to interpret the extracted code, monitor at least any of values and arguments assigned to the object and the function and the property of the object used in the transfer code or a content acquisition code during the interpretation, and extract the URL of the another site by execution of the transfer code.

3. An analysis method to analyze a code included in web content, the method comprising:
accessing, via the Internet, a site that provides the web content;
searching a transfer code to another site from the code by performing syntax analysis of the code included in the web content;
specifying at least any of an object and a function and a property of the object which are used in the transfer code found as a result of the search;
extracting a code having a dependence relationship with the transfer code based on at least any of the object and the function and the property of the object thus specified;
storing a uniform resource locator (URL) of the another site in a memory; and
analyzing the URL of the another site stored in the memory to determine if the another site is a malicious site,
wherein the method further includes
constructing a program dependence graph, which represents a data dependence relationship and a control dependence relationship between nodes, using each statement of the code included in the web content as the node when the transfer code is found as a result of the search by the processing circuitry, and specifying a node corresponding to the found transfer code using the program dependence graph, and
reversely slicing the code based on the data dependence relationship in the program dependence graph using the specified node as a slicing criteria to extract a code having the dependence relationship with the transfer code.

4. A non-transitory computer readable storage medium having stored therein an analysis program to analyze a code included in web content, the program causing a computer to execute a process comprising:
accessing, via the Internet, a site that provides the web content;
searching a transfer code to another site from the code by performing syntax analysis of the code included in the web content;
specifying at least any of an object and a function and a property of the object which are used in the transfer code found as a result of the search;
extracting a code having a dependence relationship with the transfer code based on at least any of the object and the function and the property of the object thus specified;
storing a uniform resource locator (URL) of the another site in a memory; and
analyzing the URL of the another site stored in the memory to determine if the another site is a malicious site, wherein the process further includes
constructing a program dependence graph, which represents a data dependence relationship and a control dependence relationship between nodes, using each statement of the code included in the web content as the node when the transfer code is found as a result of the search by the processing circuitry, and specifying a node corresponding to the found transfer code using the program dependence graph, and
reversely slicing the code based on the data dependence relationship in the program dependence graph using the specified node as a slicing criteria to extract a code having the dependence relationship with the transfer code.

5. An analysis device that analyzes a code included in web content, the device comprising:
processing circuitry configured to
access, via the Internet, a site that provides the web content;
construct a program dependence graph, which represents a data dependence relationship and a control dependence relationship between statements using the respective statements of the code as nodes;
extract statements relating to reference of variable definition of a slicing criteria by tracing an edge in the data dependence relationship from the slicing criteria in the program dependence graph using a node representing a transfer code or a conditional branch statement in the program dependence graph as the slicing criteria, extract a statement relating to a control flow of the extracted statement by tracing an edge representing the control dependence relationship from each of the extracted statements a predetermined number of times or less, and extract a statement having the dependence relationship with the slicing criteria as a slice,
extract a slice using a node representing the transfer code in the program dependence graph as a slicing criteria,
extract a slice for each execution path by performing syntax analysis of the slice when the extracted slice includes a plurality of the execution paths of the code,
cause a script interpreter to interpret each of the extracted slices, monitor at least any of values and arguments assigned to the object and the function and the property of the object used in the transfer code during the interpretation, and extract a URL (Uniform Resource Locator) of a web site accessed by the slice execution and store the extracted URL into a memory, and
analyze the URL of the website stored in the memory to determine if the web site is a malicious site.

6. The analysis device according to claim 5, wherein
when the program dependence graph includes the node representing the conditional branch statement, the processing circuitry extracts a slice using the node representing the conditional branch statement as the slicing criteria, and
the processing circuitry causes a script interpreter to interpret the extracted slice, monitors at least any of values and arguments assigned to the object and the function and the property of the object relating to a character string operation during the interpretation, and specifies client environment information used in the slice execution.

7. The analysis device according to claim 5, wherein
when the program dependence graph includes the node representing the conditional branch statement in a case where the URL is extracted by the processing circuitry, the processing circuitry
extracts a slice using the node representing the conditional branch statement in the program dependence graph as the slicing criteria, and
causes the script interpreter to interpret the extracted slice, monitors at least any of values and arguments assigned to the object and the function and the property of the object relating to a character string operation during the interpretation, specifies client environment information used in the slice execution, and associates the extracted URL with the client environment information.

8. An analysis method to analyze a code included in web content, the method comprising:
accessing, via the Internet, a site that provides the web content;
constructing a program dependence graph, which represents a data dependence relationship and a control dependence relationship between statements using the respective statements of the code as nodes;
extracting statements relating to reference of variable definition of a slicing criteria by tracing an edge in the data dependence relationship from the slicing criteria in the program dependence graph using a node representing a transfer code or a conditional branch statement in the program dependence graph as the slicing criteria, extracting a statement relating to a control flow of the extracted statement by tracing an edge representing the control dependence relationship from each of the extracted statements a predetermined number of times or less, and extracting a statement having the dependence relationship with the slicing criteria as a slice;
extracting a slice using a node representing the transfer code in the program dependence graph as a slicing criteria;
extracting a slice for each execution path by performing syntax analysis of the slice when the extracted slice includes a plurality of the execution paths of the code;
causing a script interpreter to interpret each of the extracted slices, monitor at least any of values and arguments assigned to an object and a function and a property of the object used in the transfer code during the interpretation, and extract a URL (Uniform Resource Locator) of a web site accessed by the slice execution and store the extracted URL into a memory; and
analyzing the URL of the website stored in the memory to determine if the website is a malicious site.

9. A non-transitory computer readable storage medium having stored therein an analysis program to analyze a code included in web content, the program causing a computer to execute a process comprising:
accessing, via the Internet, a site that provides the web content;
constructing a program dependence graph, which represents a data dependence relationship and a control dependence relationship between statements using the respective statements of the code as nodes;
extracting statements relating to reference of variable definition of a slicing criteria by tracing an edge in the data dependence relationship from the slicing criteria in the program dependence graph using a node representing a transfer code or a conditional branch statement in the program dependence graph as the slicing criteria, extracting a statement relating to a control flow of the extracted statement by tracing an edge representing the control dependence relationship from each of the extracted statements a predetermined number of times or less, and extracting a statement having the dependence relationship with the slicing criteria as a slice;

extracting a slice using a node representing the transfer code in the program dependence graph as a slicing criteria;

extracting a slice for each execution path by performing syntax analysis of the slice when the extracted slice includes a plurality of the execution paths of the code;

causing a script interpreter to interpret each of the extracted slices, monitor at least any of values and arguments assigned to an object and a function and a property of the object used in the transfer code during the interpretation, and extract a URL (Uniform Resource Locator) of a web site accessed by the slice execution and store the extracted URL into a memory; and analyzing the URL of the website stored in the memory to determine if the website is a malicious site.

10. The analysis device according to claim 5, wherein the processing circuitry is configured to extract the statement relating to the control flow of the extracted statement by tracing an edge representing the control dependence relationship from each of the extracted statements only one time.

* * * * *